(12) United States Patent
Takada et al.

(10) Patent No.: US 7,698,018 B2
(45) Date of Patent: Apr. 13, 2010

(54) RING MANAGEMENT SYSTEM

(75) Inventors: Kazutoshi Takada, Sayama (JP); Takaji Mukumoto, Sayama (JP); Hideshi Sato, Sayama (JP); Osamu Takenaka, Sayama (JP); Tetsuo Sugizono, Sayama (JP); Katsumune Inaki, Sayama (JP); Hiroki Tahira, Sayama (JP); Koji Saito, Sayama (JP); Katsuyuki Nakajima, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 252 days.

(21) Appl. No.: 11/812,332

(22) Filed: Jun. 18, 2007

(65) Prior Publication Data
US 2007/0250209 A1 Oct. 25, 2007

Related U.S. Application Data

(62) Division of application No. 10/475,143, filed as application No. PCT/JP02/02247 on Mar. 11, 2002, now Pat. No. 7,251,545.

(30) Foreign Application Priority Data

| Apr. 20, 2001 | (JP) | ............................. 2001-122208 |
| Jun. 1, 2001 | (JP) | ............................. 2001-167296 |
| Jun. 1, 2001 | (JP) | ............................. 2001-167297 |
| Jun. 27, 2001 | (JP) | ............................. 2001-194668 |

(51) Int. Cl.
*G06F 7/00* (2006.01)
(52) U.S. Cl. ...................................... 700/213; 700/228

(58) Field of Classification Search ................. 700/228, 700/213, 214, 230, 219; 414/273, 270, 331.04; 209/579
See application file for complete search history.

(56) References Cited

U.S. PATENT DOCUMENTS 4,687,107 A * 8/1987 Brown et al. ................ 209/556

(Continued)

FOREIGN PATENT DOCUMENTS

| JP | 6-194151 A | 7/1994 |
| JP | 9-314431 A | 12/1997 |
| JP | 10-169719 A | 6/1998 |

(Continued)

*Primary Examiner*—Gene Crawford
*Assistant Examiner*—Ramya Prakasam
(74) *Attorney, Agent, or Firm*—Birch, Stewart, Kolasch & Birch, LLP

(57) ABSTRACT

A production system capable of further improving production efficiency and quality. The ring management system includes size measurement unit for measuring size of the ring, first convey unit for moving the ring w whose size has been measured, a first stocker having a plurality of storage positions for storing rings conveyed by the first convey unit, a second convey unit for conveying out the rings from the first stocker means for stacking, and a control unit. The control unit includes memory means for storing the rings size measured by the size measurement means in association with the storage position in the first stocker, first selection means for selecting a ring constituting a stacked ring according to the ring size stored in the memory means, and first instruction means to instruct the second convey unit to convey out the ring selected by the first selection means from the storage position pj in the first stocker.

9 Claims, 16 Drawing Sheets

U.S. PATENT DOCUMENTS

| | | | |
|---|---|---|---|
| 4,792,049 A * | 12/1988 | Janoick et al. | 209/556 |
| 4,832,204 A * | 5/1989 | Handy et al. | 209/3.3 |
| 4,974,164 A * | 11/1990 | Lewis et al. | 702/161 |
| 5,175,692 A * | 12/1992 | Mazouz et al. | 700/217 |
| 5,860,504 A * | 1/1999 | Lazzarotti | 198/357 |
| 6,155,025 A * | 12/2000 | Komiya et al. | 53/147 |
| 6,484,886 B1 * | 11/2002 | Isaacs et al. | 209/539 |
| 6,531,672 B2 * | 3/2003 | Malloy | 209/579 |
| 6,728,417 B1 * | 4/2004 | Hara et al. | 382/275 |

FOREIGN PATENT DOCUMENTS

| | | |
|---|---|---|
| JP | 10-310286 A | 11/1998 |
| JP | 11-281342 A | 10/1999 |
| JP | 2000-302210 A | 10/2000 |
| JP | 2001-30146 A | 2/2001 |
| JP | 2001-82950 A | 3/2001 |
| JP | 2002-144161 A | 5/2002 |

* cited by examiner

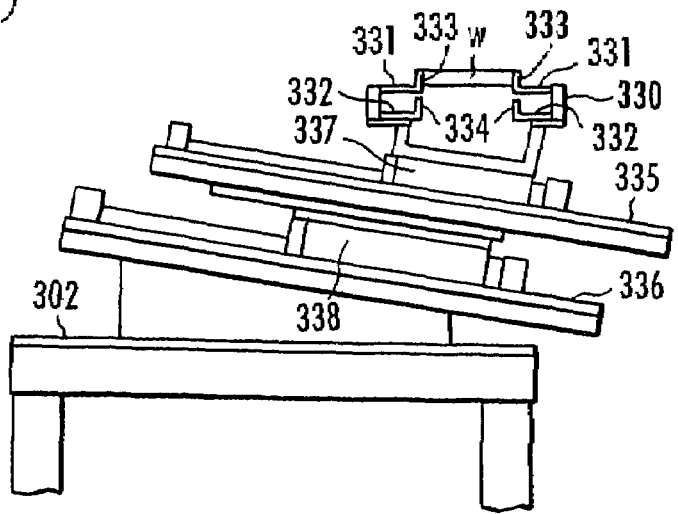
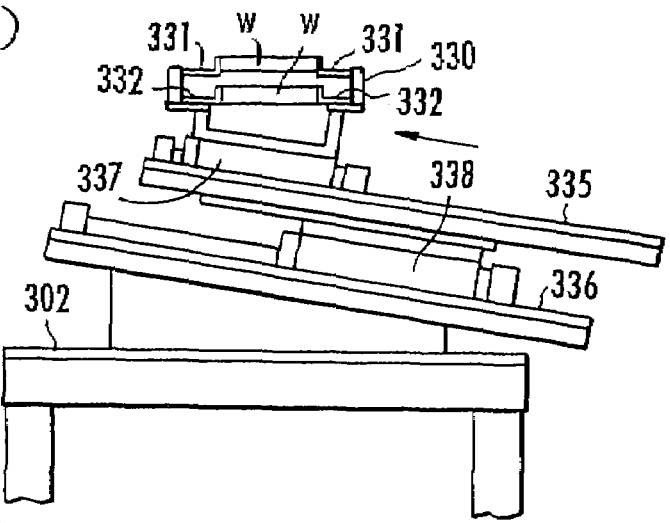
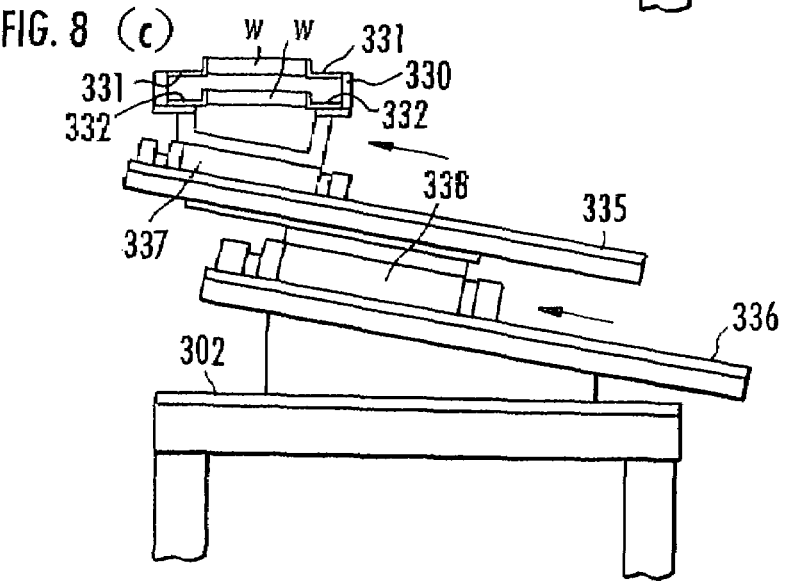

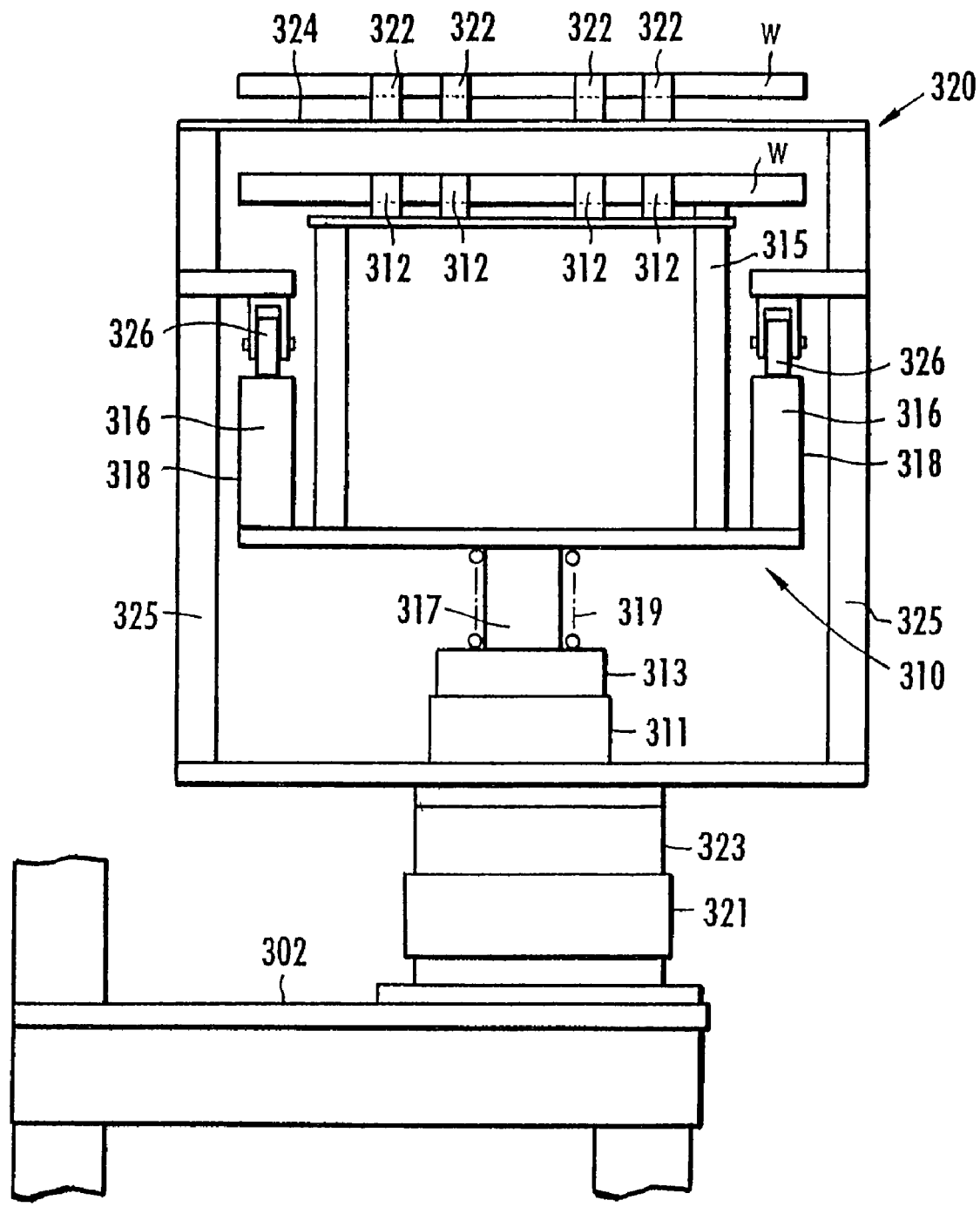

RING MANAGEMENT SYSTEM

This application is a Divisional of Application No. 10/475,143, filed on Nov. 23, 2003, now U.S. Pat. No. 7,251,545 and for which priority is claimed under 35 U.S.C. § 120. Application No. 10/475,143 is the national phase of PCT International Application No. PCT/JP02/02247 filed on Mar. 11, 2002 under 35 U.S.C. § 371, which also claims priority to Application No. 2001-122208 filed in Japan on Apr. 20, 2001, Application No. 2001-167296 filed in Japan on Jun. 1, 2001, Application No. 2001-167297 filed in Japan on Jun. 1, 2001, and Application No. 2001-194668 filed in Japan on Jun. 27, 2001 under 35 U.S.C. § 119. The entire contents of each of the above-identified applications are hereby incorporated by reference.

TECHNICAL FIELD

The present invention relates to a ring management system for a plurality of rings having elasticity in the radius direction for layered ring configuration.

BACKGROUND ART

A non-stage speed change gear (CVT) belt used for a speed change gear in an automobile and the like includes a plurality of endless metal rings (hereinafter, referred to simply as "rings") layered in the thickness direction. Each ring is manufactured to have a different circumferential length and thickness preset according to its layer. These rings are selected, combined, and produced into a layered ring.

Each of the rings is produced so as to satisfy the size of each layer but actual size may be slightly different from the set values. Combination of such rings may not produce a layered ring of high quality.

Rings are firstly measured in size and then placed on a storage shelf or the like. According to the measurement values, rings to be combined are selected. The selected rings are taken out of the storage shelf and layered, thereby obtaining a layered ring of high quality.

Conventionally, measurement of the plurality of rings, storage of the rings after the size measurements, selection of rings, and ring layering have been separately performed and each step or transition therebetween has been performed by a corresponding staff. Difference in quality of the staff work fluctuates production efficiency and quality of the layered rings.

DISCLOSURE OF THE INVENTION

It is therefore an object of the present invention to provide a ring management system capable of improving production efficiency and quality of layered rings.

A ring management system according to a first embodiment of the present invention comprises size measurement means for measuring size of the ring, first convey means for moving the ring whose size has been measured by the size measurement means, first storage means having a plurality of storage positions for storing rings conveyed in by the first convey means, second convey means for conveying out the rings from the first storage means, and control means including memory means for storing for each of the rings, size measured by the size measurement means in association with the storage position in the first storage means, first selection means for selecting a ring for constituting a stacked ring according to the ring size stored in the memory means, and first instruction means to instruct the second convey means so as to convey out the ring selected by the first selection means from the storage position in the first storage means corresponding to the size of the ring stored by the memory means. According to this invention, the size measurement means, the first convey means, the first storage means, and the second convey means perform ring size measurement, convey for storage, storage, and convey for stacking. This eliminates difference in work quality of each working staff and can improve stacked ring production efficiency and quality.

Moreover, rings to constitute a stacked ring are selected by the first selection means according to the size measured by the size measurement means. Then, a ring stored at a storage position in association with the ring size stored by the memory means is conveyed out by the second convey means and stacked for a stacked ring. Thus, a plurality of rings constituting a most appropriate combination are selected and accurately taken out of the first storage means, thereby producing a high-quality stacked ring.

Moreover, the ring management system according to the first embodiment further comprises third convey means for conveying rings out of the first storage means, and second storage means having a plurality of storage positions for storing rings conveyed in by the third convey means, wherein the control means further includes second selection means for selecting a ring whose storage time in the first storage means reaches a predetermined time or more or having identical sizes at a predetermined number or more of places from rings being stored in the first storage means, and second instruction means for instructing the third convey means to convey out the ring selected by the second selection means from the storage position in the first storage means stored in association with the ring storage time or size and convey it into the second storage means.

According to this invention, it is possible to eliminate a situation that the same ring is stored in the first storage means for a time exceeding a predetermined time or too many rings having identical size are stored in the first storage means. Thus, it is possible to suppress reduction of the selection range of the convey-in position of the ring in the first storage means and eliminate stagnation of convey of the ring into the first storage means.

Furthermore, the ring management system according to the first embodiment of the present invention further comprises: fourth convey means for conveying rings from the second storage means, wherein the memory means stores for each of the rings, the size measured by the size measurement means in association with the storage position in the second storage means, in case rings stored in the first storage means cannot be selected, the first selection means selects a ring from the rings stored in the second storage means so as to constitute a stacked ring, and the first instruction means instructs the fourth convey means to convey out the ring selected by the first selection means from the storage position in the second storage means stored in association with the size of the ring by the memory means.

According to the present invention, when it is impossible to select an appropriate ring to constitute a stacked ring from the first storage means, the ring is selected and conveyed out from the rings stored in the second storage means.

Moreover, in the ring management system according to the first embodiment of the present invention, the size measurement means, the convey means, and the storage means include holding means for holding a circular ring in substantially elliptic shape.

According to the present invention, ring size is measured while a ring is maintained in the substantially elliptic shape and deformation in the radius direction of the ring by the restoration elasticity is suppressed. This increases the size measurement accuracy. Moreover, after the size measurement, the ring is conveyed and stored while maintaining the substantially elliptic shape. This eliminates the situation that the ring in the substantially elliptic shape is deformed by its restoration elasticity in an unpredicted direction to contact with and damage something or to be damaged itself. Furthermore, the ring is handled as "a substantially elliptic work having a constant width in the short-axis direction" regardless of the difference in ring size. Accordingly, holding means handling this work have common specifications in constituting the convey means and storage means, thereby enabling substitution and flexibililty.

In order to produce a high-quality stacked ring, it is necessary to select appropriate rings to constitute the stacked ring and it is necessary to accurately measure the circumferential length and thickness of the rings as the selection condition.

To cope with this, the size measurement means includes a pair of rollers arranged with rotation shafts parallel to each other and the shaft-to-shaft distance can be changed, circumferential length measuring means for measuring the circumferential length of a ring through the shaft-to-shaft distance of the pair of rollers while driving to rotate the ring hung over the pair of rollers and given a predetermined tension by the increase of the shaft-to-shaft distance of the rollers, thickness measurement means for measuring thickness of the ring hung over the pair of rollers and given a predetermined tension at an intermediate position between the rollers.

In the size measurement means constituting the ring management system of the present invention, firstly, a ring is hung over a pair or rollers and the shaft-to-shaft distance of the rollers is increased to apply a predetermined tension to the ring. The ring is driven to rotate by the pair of rollers and the ring circumferential length is measured according to the shaft-to-shaft distance of the pair of rollers.

Next, rotation of the pair of rollers is stopped and the ring thickness is measured by the thickness measurement means while applying a predetermined tension to the ring. Thus, by measuring the thickness while applying a predetermined tension to the ring, bending of the ring is prevented and it is possible to appropriately measure the thickness. Moreover, since it is possible to measure thickness of a plurality of rings under the common condition, it is possible to obtain ring measurement data appropriately used when deciding stacking order of the rings. Furthermore, it is possible to measure the ring circumferential length and ring thickness continuously with a high efficiency.

Moreover, the thickness measurement means includes a pair of contacts arranged at the inner circumferential side and the outer circumferential side of a ring hung over the pair of rollers in such a manner that they can advance/retrieve so as to be in abutment with each other, and contact advance/retrieve means for bringing the contacts into abutment with the inner circumferential surface and the outer circumferential surface of the ring, and means for measuring the thickness of the ring hung over the pair of rollers by a displacement of a contact with respect to the other contact.

According to the present invention, it is possible to measure a ring thickness only by measuring displacement of one of the contacts with respect to the other contact. Thus, with a simple configuration, it is possible to perform a highly accurate measurement.

Upon size measurement, thermal expansion or shrinkage may be caused in one or two of the rollers due to heat generated by driving of the rollers or the ambient temperature. When the ring outer circumferential length is measured based on the shaft-to-shaft distance between the rollers, there may be involved a large measurement error affected by the temperature.

To cope with this, the ring management system further comprises temperature measurement means for measuring temperature of at least one of the rollers, and data correction means for correcting measurement data obtained by the circumferential length measurement means and the thickness measurement means, according to the temperature measured by the temperature measurement means.

According to the present invention, the measurement data obtained by the circumferential measurement means and the thickness measurement means which have been affected by thermal expansion or shrinkage caused in one or two of the rollers due to heat generated by driving of the rollers or the ambient temperature can be corrected according to the temperature of at least one of the rollers. Accordingly, even when the temperature of one of the rollers fluctuates and measurement values fluctuate because of the thermal expansion and shrinkage, it is always possible to obtain accurate measurement data.

In order to reduce the convey space of a plurality of rings, a plurality of rings aligned in the lateral direction (ring radius direction) are preferably aligned in the vertical direction (ring axis direction). In this case, for example, after each ring is sandwiched by robot arms, robot arms can move vertically and horizontally. However, the robot arms require a comparatively large space for movement. Moreover, the ring convey requires a comparatively long time, lowering the work efficiency. For this, aligning means requiring a small drive space and capable of rapidly converting aligning direction of a plurality of rings is desired.

To cope with this, the ring management system according to the first embodiment of the present invention, further comprises aligning means for aligning in the perpendicular direction, a plurality of rings which have been measured in size and aligned in the horizontal direction before being conveyed into the first storage means by the first convey means, the aligning means including horizontal aligning means having a plurality of holding means for holding a plurality of rings arranged in the horizontal direction, perpendicular aligning means having a plurality of holding means for holding a plurality of rings arranged in the perpendicular direction, convey means for moving the perpendicular aligning means in the aligning direction of a plurality of rings by the horizontal aligning means and lifting up so that the holding means of the perpendicular aligning means successively oppose to the holding means of the horizontal aligning means, moving means for successively moving a plurality of rings held by the holding means of the horizontal aligning means onto the holding means of the perpendicular aligning means in synchronization with the movement of the perpendicular aligning means by the convey means, and convey-out means for conveying out the plurality of rings held by the holding means of the perpendicular aligning means while maintaining the arrangement in the perpendicular direction.

According to this invention, firstly, rings aligned in the horizontal direction by the horizontal aligning means are successively moved onto the holding means of the perpendicular aligning means which gradually rises up while moved in the lateral direction by the moving means. Thus, the plurality of rings which have been aligned in the horizontal direction are aligned in the perpendicular direction by the perpendicular aligning means. Thus, aligning of a plurality of rings can easily be converted from the horizontal direction to the perpendicular direction.

Moreover, the ring management system according to the first embodiment of the present invention further comprises perpendicular aligning means for aligning in the perpendicular direction a plurality of rings aligned in the horizontal direction before being conveyed into the first storage means by the first convey means after the size measurement by the size measurement means, the aligning means including a plurality of holding means arranged in the horizontal direction for holding a plurality of rings, moving means for successively moving one holding means immediately below another holding means, so that the plurality of holding means arranged in the horizontal direction are aligned in the perpendicular direction, and convey-out means for conveying out the rings held by the plurality of holding means arranged in the perpendicular direction while maintaining the state aligned in the perpendicular direction.

According to the present invention, a plurality of rings are firstly aligned in the horizontal direction by being held by a plurality of holding means arranged in the horizontal direction. Then, the moving means moves one of the holding means immediately below another holding means and thus successively moves the holding means, thereby arranging the plurality of holding means in the perpendicular direction. Thus, the plurality of rings aligned in the perpendicular direction. That is, moving of the holding means can rapidly converts the ring alignment direction, thereby improving work efficiency.

Moreover, the aligning means includes a slider for moving one holding means toward another holding means, a support member which can be lifted up and down along a guide rod extending from the slider and having holding means at the upper portion thereof urging means for urging the support member upward, an inclined portion provided on the support member and is gradually inclined downward toward the other holding means, and a cam roller for pressing the support member against the urging force by the urging means via the inclined portions as the slider moves, so as to guide one holding means immediately below the other holding means.

According to the present invention, only by moving a holding means at the upstream side by the slider toward the holding means at the downstream side, the inclined portion and the cam roller are brought into sliding abutment, so as to lower the holding means of the upstream side via the support member. Thus, it is possible to smoothly move the other holding means from the upstream side to immediately below the other holding means at the downstream side. This simplifies the system configuration and rapidly converts the ring alignment direction.

In order to solve the aforementioned problems, a ring management system according to a second embodiment of the present invention comprises size measurement means for measuring size of a ring by hanging the circular ring over a pair of rollers whose shaft-to-shaft distance can be changed so that the ring is in the substantially elliptic shape, first convey means for moving the ring removed from the pair of rollers, while sandwiching the ring by sandwiching means so as to maintain the substantially elliptic shape of the ring which tends to return to circular shape, first storage means having a plurality of storage positions for storing rings conveyed in by the first convey means and released from the sandwiching means of the first convey means while regulating the ring tending to return to a circular shape from the substantially elliptic shape in the short-axis direction with regulating means, and second convey means for conveying out the rings from the first storage means by releasing the ring from the regulating means of the first storage means by sandwiching the ring and reducing the sandwiching interval while maintaining the substantially elliptic shape with sandwiching means.

According to the present invention, ring size is measured while the ring is maintained in the substantially elliptic shape and deformation in the radius direction of the ring by the restoration elasticity is suppressed. Accordingly, it is possible to increase the size measurement accuracy.

Moreover, after the size measurement, the ring is conveyed and stored while maintaining the substantially elliptic shape. Accordingly, it is possible to prevent a situation that the ring in the substantially elliptic shape is deformed in an unexpected direction by its restoration elasticity to contact with and damage something or to be damaged itself.

Furthermore, the ring is handled as "an substantially elliptic work having a constant width in the short-axis direction" regardless of the difference in ring size. Accordingly, holding means handling this work have common specifications in constituting the convey means and storage means, thereby enabling substitution and flexibility.

Moreover, the size measurement means, the first convey means, the first storage means, and the second convey means perform a series of procedures including the ring size measurement, convey for storage, storage, and convey for stacking. This eliminates the difference of work caused by different working staffs and can improve the stacked ring production efficiency and quality.

Moreover, the ring management system according to the second embodiment of the present invention further comprises third convey means for releasing a ring stored in the substantially elliptic shape in the first storage means, from the regulating means of the first storage means by sandwiching the ring and reducing the sandwiching interval with sandwiching means and conveying the ring while maintaining the substantially elliptic shape, and second storage means having a plurality of storage positions for storing rings and released from the sandwiching means of the third convey means while regulating the ring tending to return to a circular shape from the substantially elliptic shape in the short-axis direction with regulating means.

Furthermore, the ring management system according to the second embodiment of the present invention further comprises fourth convey means for conveying out the rings from the second storage means by releasing the ring from the regulating means of the second storage means by sandwiching the ring and reducing the sandwiching interval while maintaining the substantially elliptic shape with sandwiching means.

Moreover, the ring management system according to the second embodiment of the present invention further comprises hanging means, wherein the circular ring is sandwiched by sandwiching means so as to be in the substantially elliptic shape whose long-axis direction is matched with the roller-from-roller departing direction of the size measurement means and the ring is conveyed outside of this pair of rollers, and the size measurement means releases the ring conveyed outside the rollers by the hanging means, from the sandwiching means of the hanging means by increasing the shaft-to-shaft distance of the rollers, so that the ring is hung over the rollers.

Furthermore, the ring management system according to the second embodiment of the present invention further comprises removal means for removing the ring from the pair of rollers, which ring tends to return to the circular shape from the substantially elliptic shape with reduction of the shaft-to-shaft distance of the pair of rollers of the size measurement means, by sandwiching the ring in the short-axis direction, so as to maintain the substantially elliptic shape.

Moreover, in the ring management system according to the second embodiment of the present invention further comprises aligning means for aligning the rings in the horizontal direction while regulating the ring, which tends to return to the circular shape from the substantially elliptic shape after being removed form the pair of rollers of the size measurement means, in its short-axis direction and keeping its substantially elliptic shape with first regulating means, and conveying the ring after releasing the rings from the first regulating means by sandwiching the ring aligned in the horizontal direction in the substantially elliptic shape and reducing the sandwiching interval with sandwiching means, and aligning the rings in the horizontal direction while keeping their substantially elliptic shapes after releasing the rings from the sandwiching means by regulating the ring, which tends to return to the circular shape from the substantially elliptic shape when the sandwiching interval of the sandwiching means is increased, in its short-axis direction with second regulating means, wherein the first convey means convey the ring while keeping its substantially elliptic shape, after releasing the rings, which have been aligned in the horizontal direction by the aligning means, from the second regulating means of the aligning means by sandwiching the rings and reducing the sandwiching interval with sandwiching means.

BRIEF DESCRIPTION OF DRAWINGS

FIG. 8 explains operation of the aligning unit.
FIG. 15 and FIG. 16 explain operation of the aligning unit according to the second embodiment.

BEST MODE FOR CARRYING OUT THE INVENTION

Figure 1:
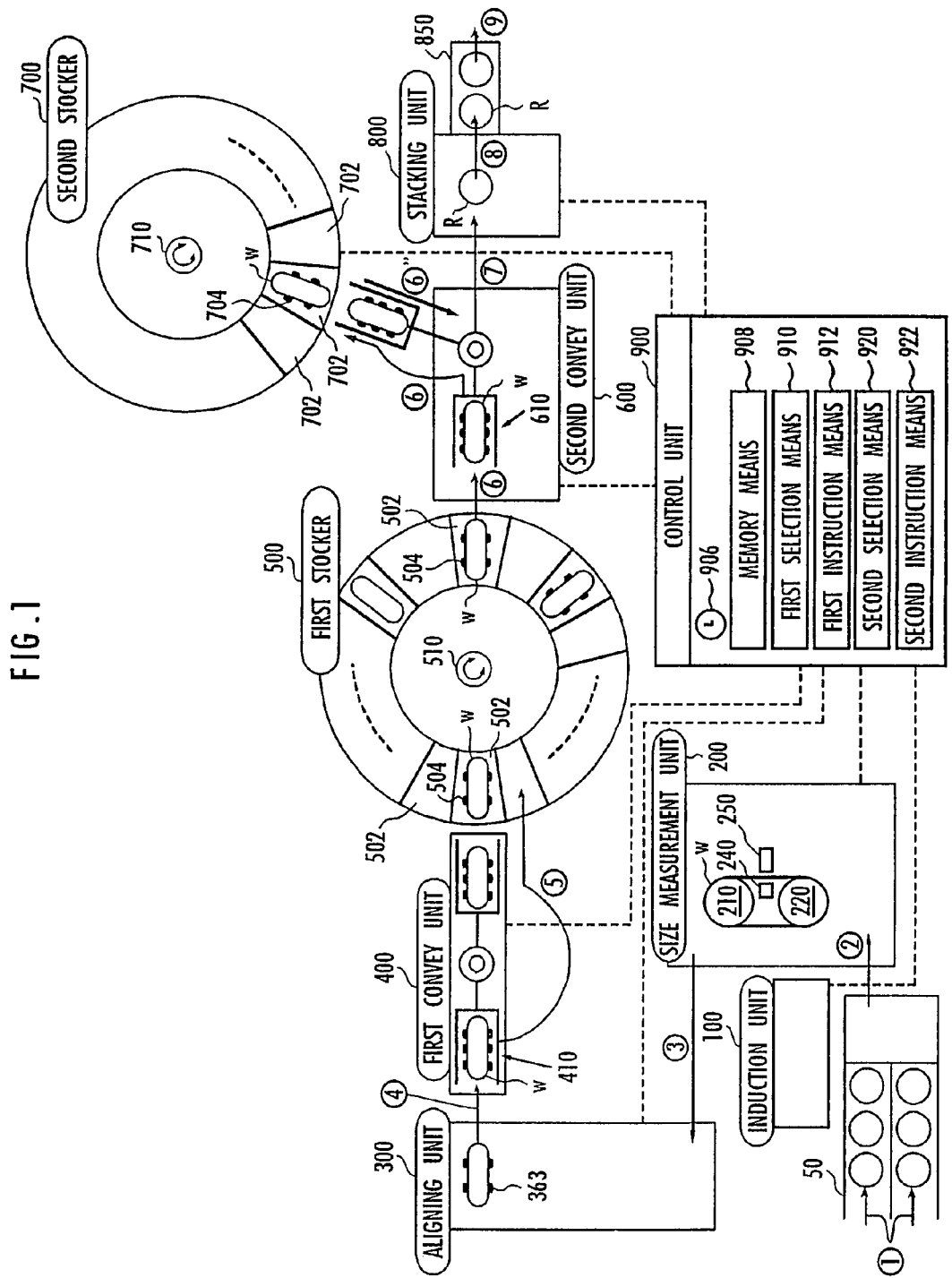
FIG. 1 explains a configuration of the ring management system according to an embodiment of the present invention.

Description will now be directed to a ring management system according to an embodiment of present invention with reference to the attached drawings. The ring management system shown in FIG. 1 includes: a conveyer belt 50; an induction unit 100; a size measurement unit 200; an aligning unit 300; a first convey unit 400, a first stocker (first storage means) 500; a second convey unit 600; a second stocker (second storage means) 700; a stacking unit 800; a conveyer belt 850; and a control unit 900.

The conveyer belt 50 conveys a plurality of rings w in the original substantially elliptic shape in lateral direction (radius direction) (indicated by arrow 1 in FIG. 1).

Figure 2:
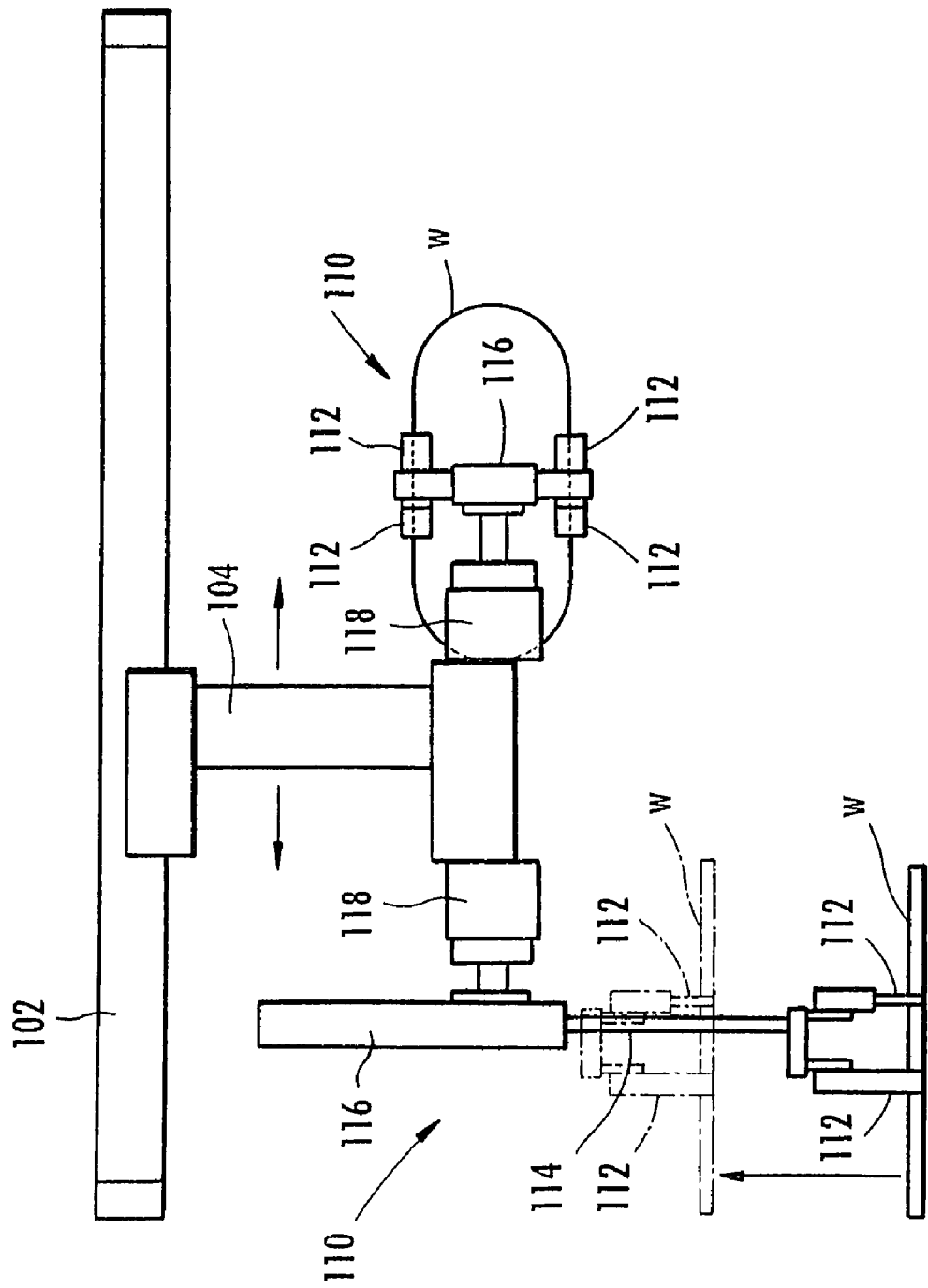
FIG. 2 explains an essential portion of an induction unit.

As shown in FIG. 2, the induction unit 100 includes: a rail 102 extending in the convey direction of the ring w; a frame 104 movable along the rail 102; a pair of right and left sandwiching means 110 movable together with the frame 104. The sandwiching means 110 includes: two pairs of claws 112 opposing to each other; a cylinder 116 for horizontally moving the claws 112 via a rod 114 in a vertical direction against the opposing direction; and a rotary actuator 118 for rotating the cylinder 116 in a direction vertical to the axial direction. By the induction unit 100, the ring w which tends to return to a substantially circular shape is regulated by the opposing two pairs of claws 112 and sandwiched in the substantially elliptic shape.

The induction unit 100 places the ring w conveyed by the conveyer belt 50 on a pair of rollers 210 and 220 of the size measurement unit 200 as substantially elliptic "hanger means" (arrow 2 in FIG. 1). Moreover, the induction unit 100 removes the ring w from the pair of rollers 210 and 220 as "removal means" while maintaining the substantially elliptic shape and transports it to the aligning unit 300 (arrow 3 in FIG. 1).

Figure 3:
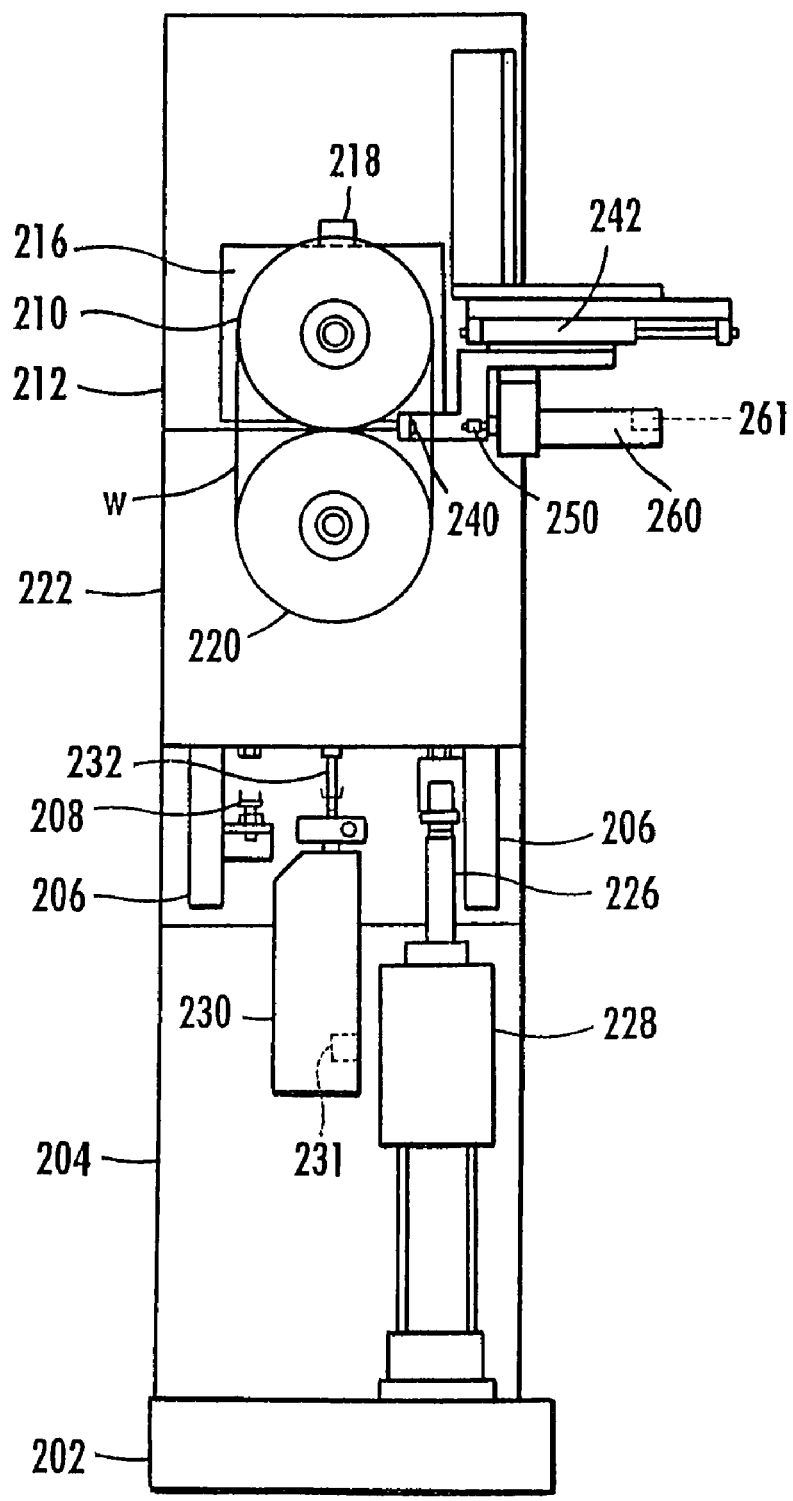
FIG. 3 is a front view of a size measurement unit.
Figure 4:
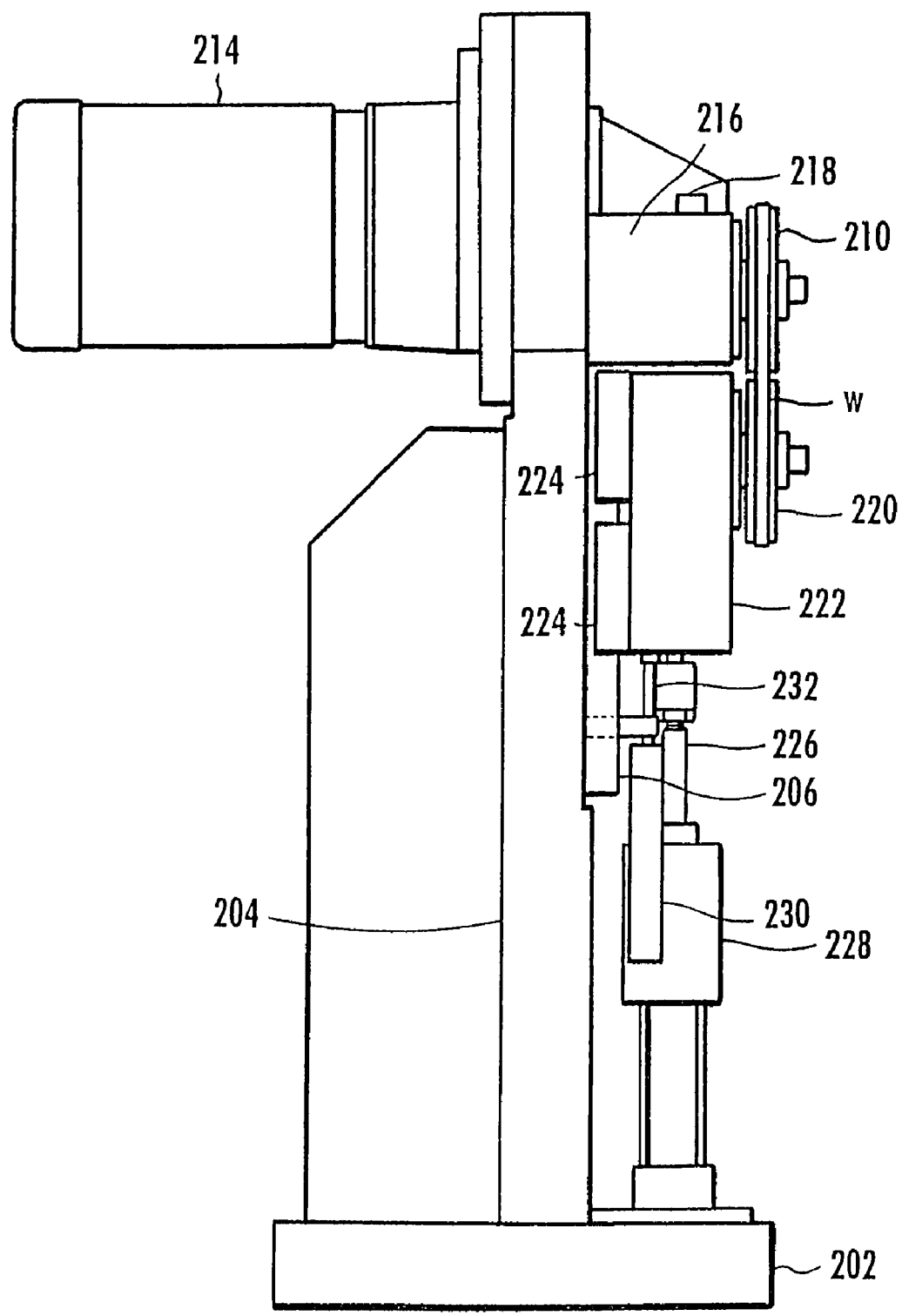
FIG. 4 is a side view of the size measurement unit.
Figure 5:
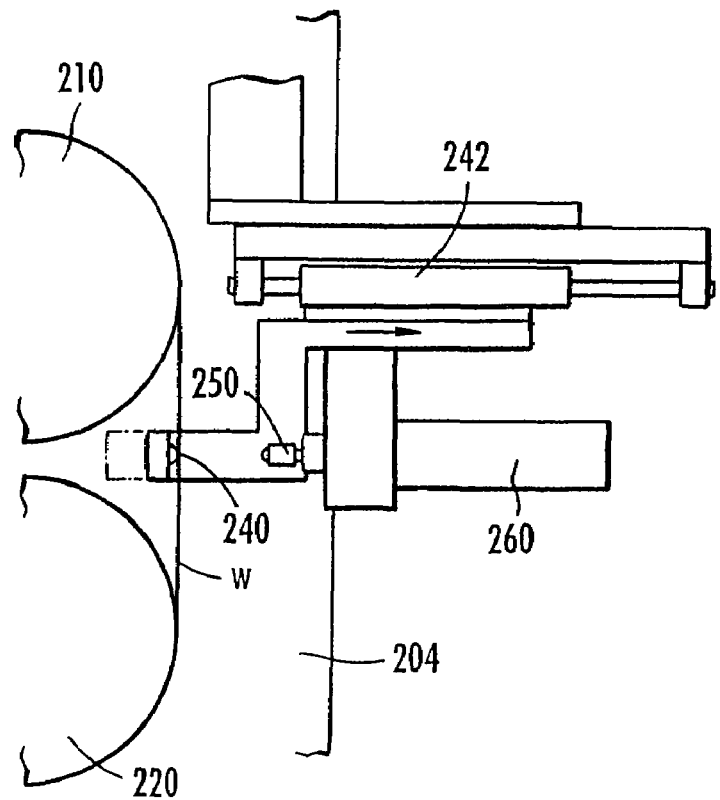
FIG. 5 explains ring thickness measurement method in the size measurement unit.
Figure 5:
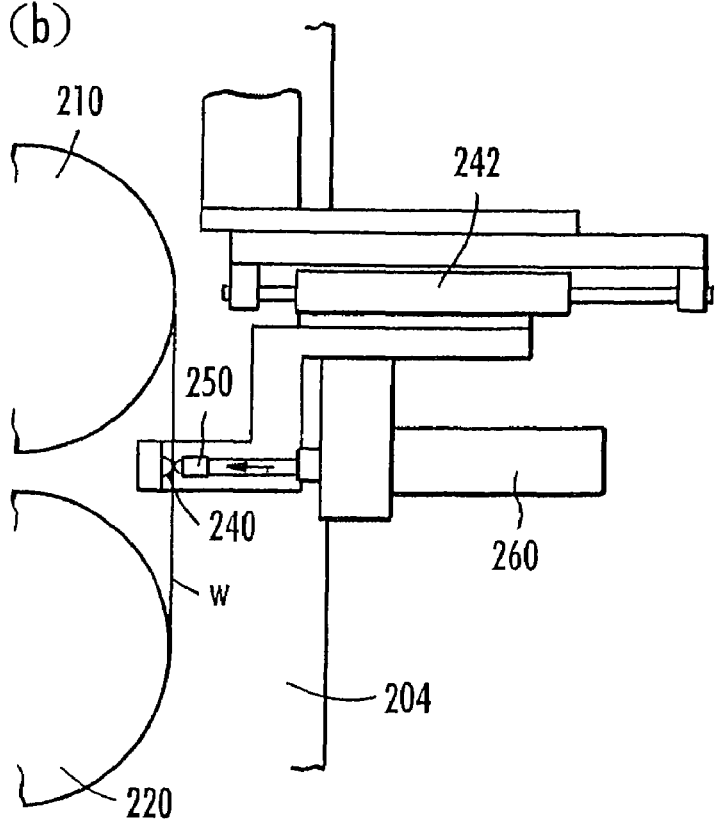

Now explanation will be given on the configuration of the size measurement unit 200 with reference to FIG. 3 and FIG. 4.

The size measurement unit 200 as the "circumferential length measurement means" of the ring w includes: a drive roller 210; a follower roller 220 placed below and in parallel to the drive roller 210; a first displacement sensor 230 for outputting a signal according to a displacement amount of the follower roller 220 in the perpendicular direction; and calculation means 231 consisting of a CPU and the like measuring the circumferential length (inner circumferential length) l of the ring w according to the output signal from the first displacement sensor 230.

The drive roller 210 has its shaft supported via a bracket 212 by a column 204 extending from a basement 202. The drive roller 210 is driven to rotate by a drive motor 214 (drive means) provided at the back of the column 204. The bracket 212 has an upper limit switch (not depicted). Above a bearing block 216 of the drive roller 210, there is provided a temperature sensor 218 for outputting a signal according to the temperature of the drive roller 210 measured via the bearing block 216.

The follower roller 220 is shaft-supported by the bracket 222. The bracket 222 is engaged with two rail members 206 vertically extending on the column 204 via an engagement member 224 so as to be slidable along the rail members 206. Moreover, the bracket 222 is lifted up by a cylinder 228 via a rod 226 connected to the lower portion thereof. Furthermore, the bracket 222 applies by its weight, tension to the ring w hung over pair of the rollers 210 and 220. The rail member 206 has a lower limit switch 208 at a lower portion thereof.

The first displacement sensor 230 has expandable contact 232. The contact 232 is in abutment with the lower portion of the bracket 222 on a perpendicular line including the axial center of the drive roller 210 and the axial center of the follower roller 220. The contact 232 is urged in the direction of the bracket by urging means (not depicted) such as a spring member and the tip end of the contact 232 is displaced together with the bracket 222.

Moreover, the size measurement unit 200 includes as the "thickness measurement means" of the ring w: an inner contact 240 to oppose to inner circumferential surface of the ring w hung over both the rollers 210 and 220 and an outer contact 250 to oppose to the outer circumferential surface of the ring w hung over both the rollers 210 and 220; a second displacement sensor 260 for outputting a signal according to a displacement amount of the outer contact 250; and calculation means 261 composed of a CPU or the like for measuring the thickness t of the ring w according to the output signal from the second displacement sensor 260.

Inner contact 240 is horizontally driven by the cylinder 242. The outer contact 250 is horizontally driven by the second displacement sensor 260.

The size measurement unit 200 measures the circumferential length of the ring w hung over the pair of rollers 210 and 220 in the substantially elliptic shape according to displacement during rotation of the rollers 210 and 220. Moreover, the size measurement unit 200 measures the thickness of the ring w hung over the pair of rollers 210 and 220 in the substantially elliptic shape. It should be noted that here the "circumferential length" of the ring w is a length along the inner circumferential length of the ring w, i.e., "inner circumferential length".

Figure 6:
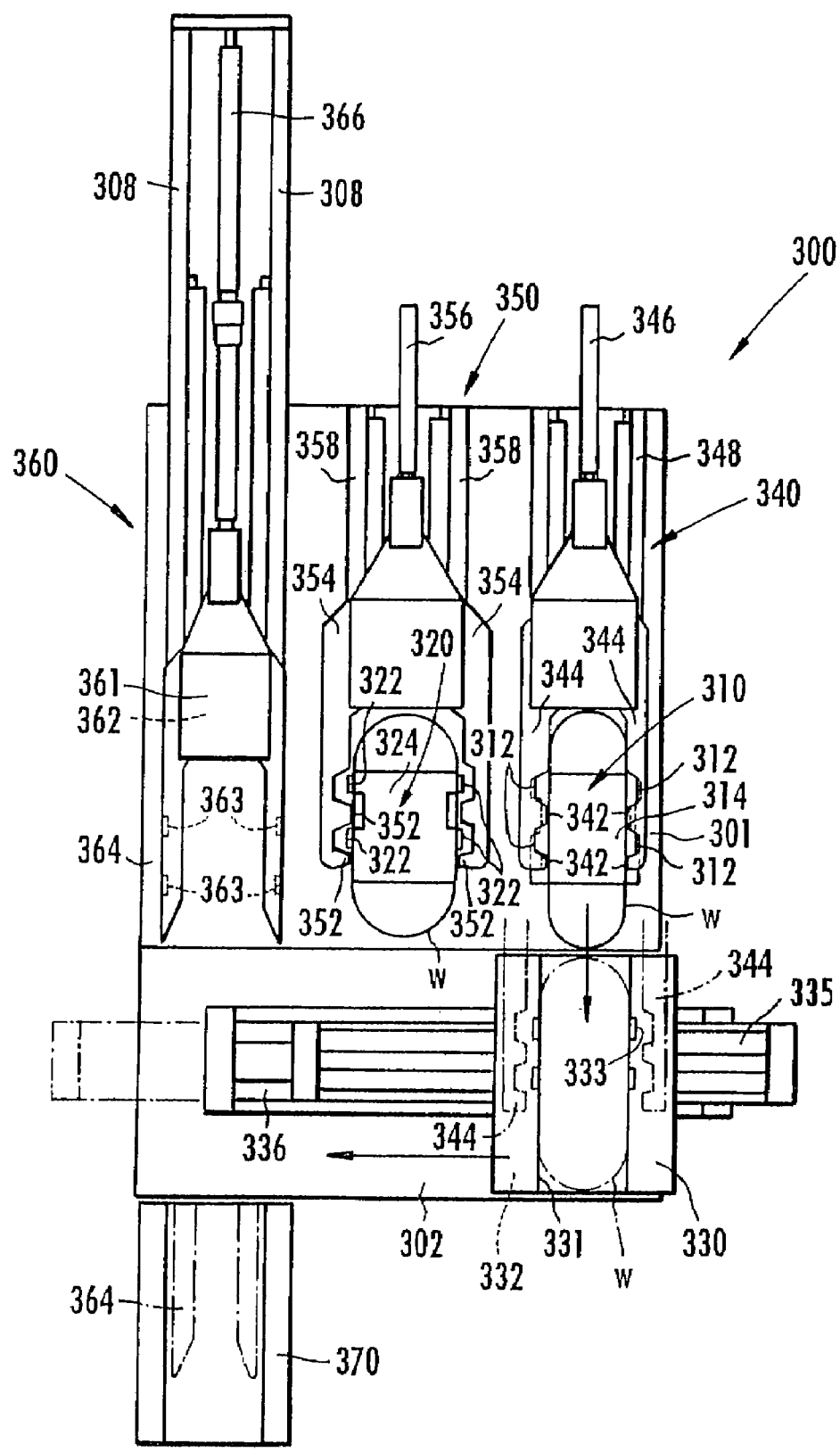
FIG. 6 and FIG. 7 explains configuration of an aligning unit.
Figure 7:
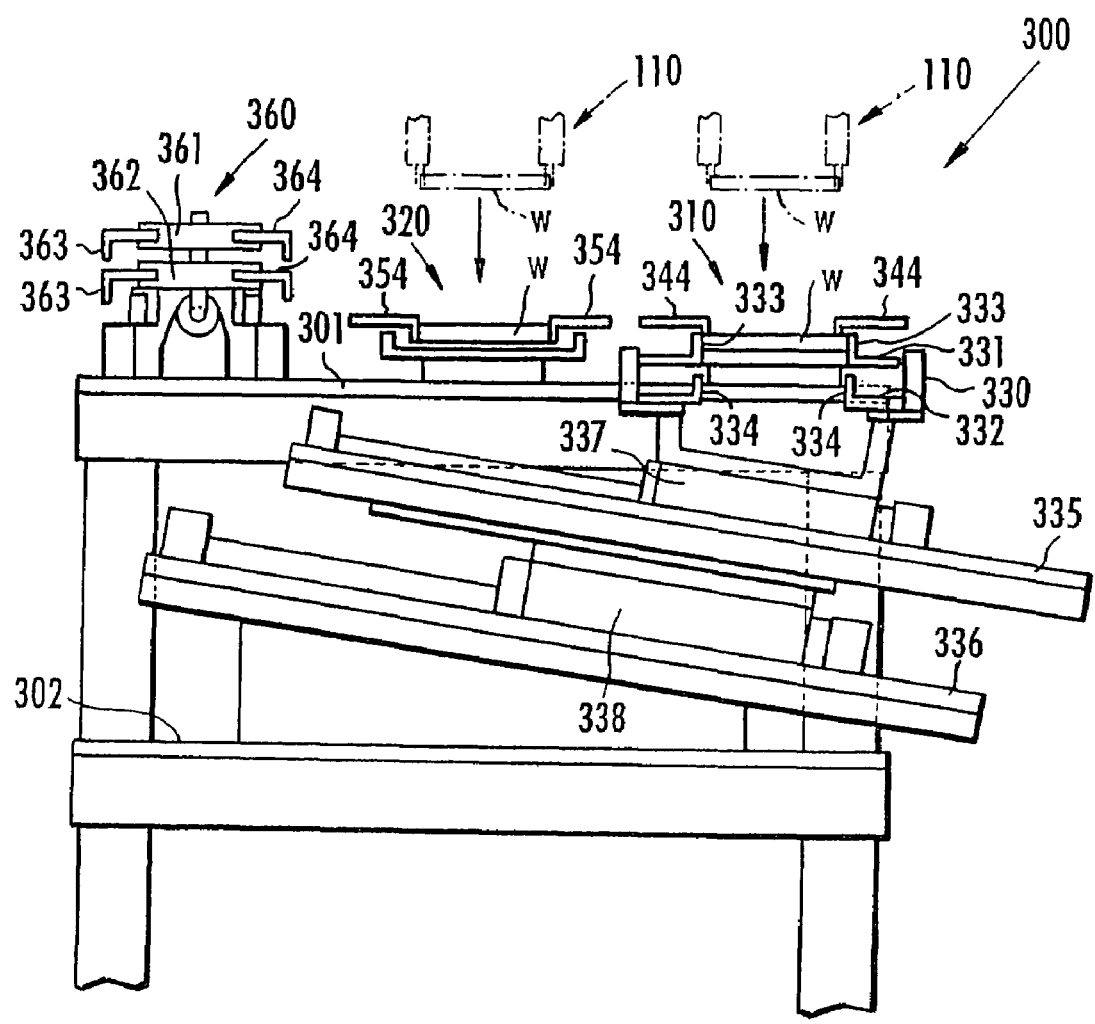

Explanation will be given on configuration of the aligning unit 300 with reference to FIG. 6 and FIG. 7.

The aligning unit 300 includes first holding means 310 and second holding means 320 as configuration of "horizontal aligning means". Moreover, the aligning unit 300 includes perpendicular aligning means 330. The perpendicular aligning means 330 has upper holding means 331 and lower holding means 332 for aligning rings w in a perpendicular direction.

Furthermore, the aligning unit 300 includes first moving means 340 and second moving means 350 for moving the ring w held by the first holding means 310 and the second holding means 320 onto the upper holding means 331 and the lower holding means 332 of the perpendicular aligning means 330; and convey-out means 360 for conveying out a pair of rings w aligned in a perpendicular direction by the perpendicular aligning means 330.

The first holding means 310 and the second holding means 320 respectively have plates 314 and 324 where the ring w is placed and regulating means 312 and 322 for regulating the ring w placed on the plates 314 and 324 from both sides into an substantially elliptic shape.

The first moving means 340 has a pair of arms 344 for sandwiching the ring w in the substantially elliptic shape via a plurality of claws 342 positioned between regulating means 312 of the first holding means 310. Moreover, the first moving means 340 includes a cylinder 346. By this cylinder 346, advance/retrieval is performed with respect to the perpendicular aligning means 330 guided by the rail provided on a table 301.

The second moving means 350, almost identically to the first moving means 340, includes a pair of arms 354 at a changeable distance for sandwiching the ring was in the substantially elliptic shape via a plurality of claws 352 positioned between the regulating means 322 of the second holding means 320. Moreover, the second moving means 350 includes a cylinder 356. By this cylinder 356, advance/retrieval is performed with respect to the perpendicular aligning means 330 guided by the rail 358 provided on the table 301.

The upper holding means 331 and the lower holding means 332 of the perpendicular aligning means 330 respectively include regulating means 333 and 334 for regulating the ring w into the substantially elliptic shape from both sides.

In the aligning unit 340 for moving the perpendicular aligning means 330, there are provided a first inclined guide portion 335 inclined left-upward and a second inclined guide portion 336 in parallel to the first inclined guide portion 335 on an intermediate table 302. The first inclined guide portion 335 has a first slider 337 moving along the inclination and the first slider 337 is connected to the perpendicular aligning means 330. The second inclined guide portion 336 has a second slider 338 moving along the inclination and the second slider 338 is connected to the first inclined guide portion 335.

The convey-out means 360 is composed of upper convey means 361 and lower convey means 362. The upper convey means 361 and lower convey means 362 have a pair of arms 364 at a changeable distance for sandwiching the ring w in the substantially elliptic shape via a plurality of claws 363. Moreover, the convey-out means 360 has a cylinder 366. By this cylinder 366, advance/retrieval is performed with respect to the perpendicular aligning means 330 guided by the rail 368 provided on the table 301.

After the size measurement by the size measurement unit 200, the aligning unit 300 aligns the ring w (arrow 3 in FIG. 1) transported by the induction unit 100, in the substantially elliptic shape in the lateral direction. Moreover, the aligning unit 300 vertically aligns the rings w aligned in the lateral direction in the substantially elliptic shape.

Figure 9:
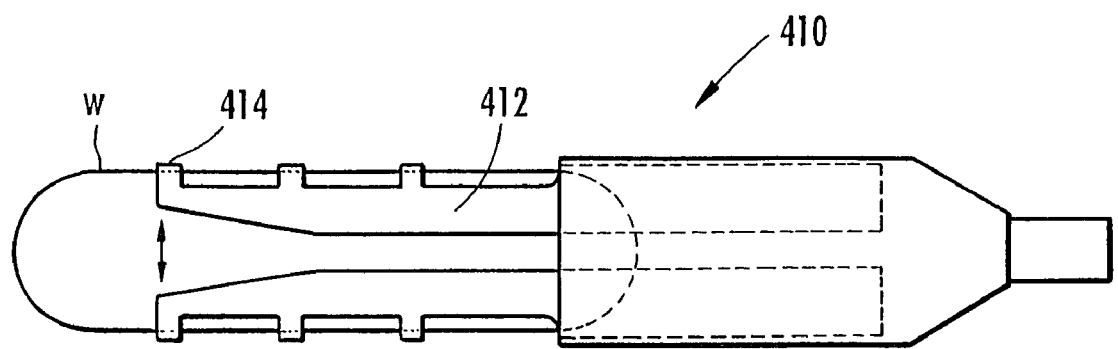
FIG. 9 explains an essential portion of a first and a second convey unit.
Figure 9:
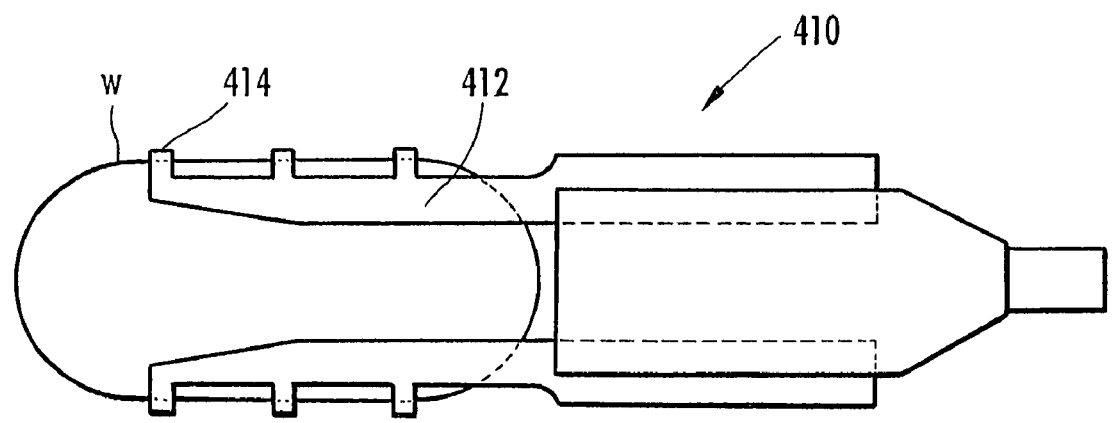

As shown in FIG. 9A and FIG. 9B, the first convey unit 400 includes first sandwiching means 410 for sandwiching the ring w at a changeable distance via the pair or arms 412 having a claw portions 414. Moreover, as shown in FIG. 10, the first convey unit 400 includes: first horizontal drive means 420 for horizontally driving the first sandwiching means 410; first perpendicular drive means 430 for perpendicularly driving the first sandwiching means 410 and the first horizontal drive means 420 along a first columnar member 402 extending outside the outer circumference of the first stocker 500; and first rotation means 440 for rotating the first columnar member 402 around its axis.

The first convey unit 400 transports the ring w from the aligning unit 300 by sandwiching the ring w by the first sandwiching means 410 in the substantially elliptic shape (arrow 4 in FIG. 1). The first sandwiching means 410 is driven in the perpendicular direction and the horizontal direction while sandwiching the ring w in its substantially elliptic shape and conveying into the first stocker 500 (arrow 5 in FIG. 1).

Figure 10:
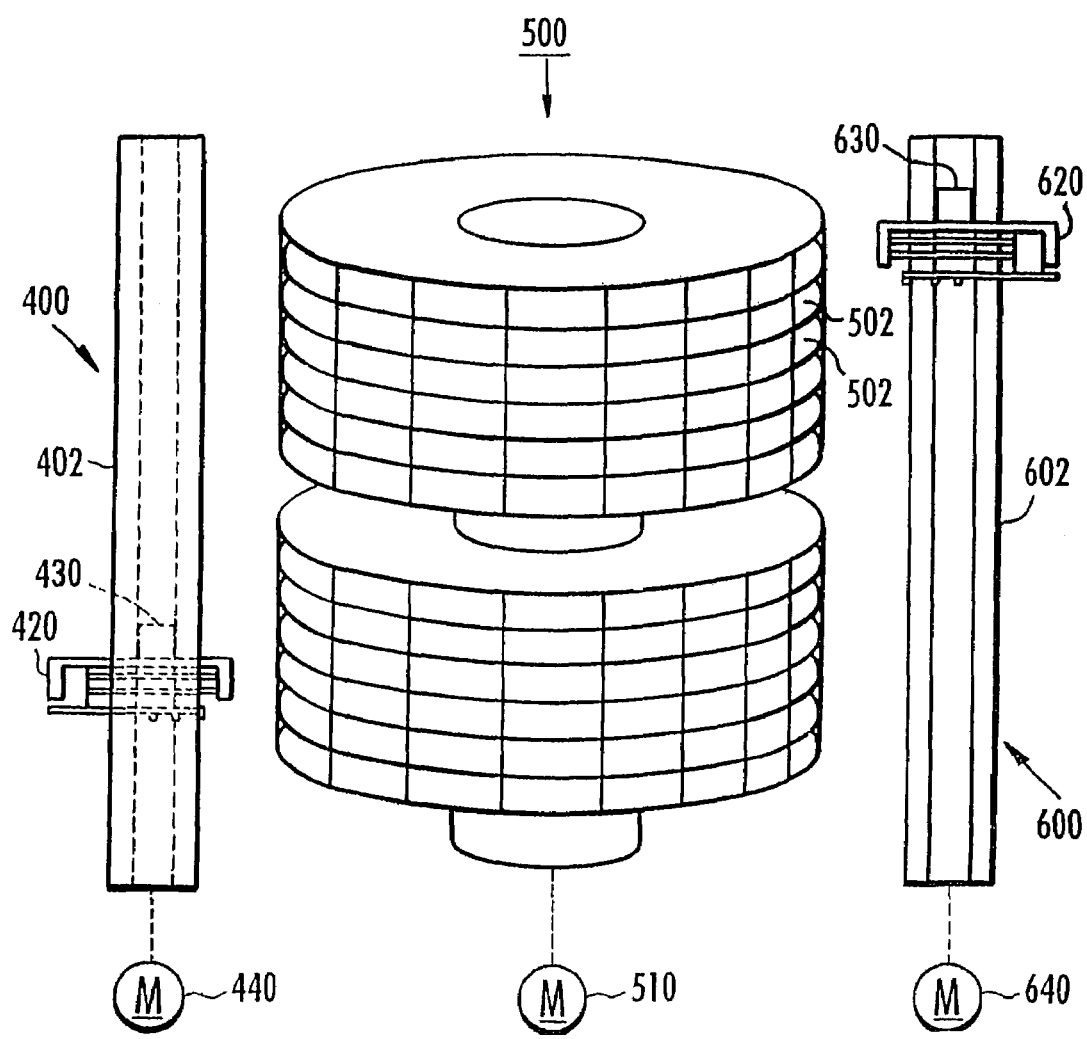
FIG. 10 explains configuration of the first and second convey units and a first stocker.

As shown in FIG. 10, the first stocker 500 is substantially cylindrical and has a plurality of storage chambers 502 partitioned in a circumferential direction and axial direction and having an open outer circumference. The first stocker 500 can be rotated around its axis by the first rotation means 510. Each of the storage chambers 502 has regulating means 504 (see FIG. 1) for regulating the ring w from both sides so as to prevent returning to circular shape. The first stocker 500 stores a plurality of rings w conveyed by the first convey unit 400 while regulating the rings w by the regulating means 504 so as to be in the substantially elliptic shape.

The second convey unit 600 has configuration identical to the first convey unit 400. The second convey unit 600 sandwiches the ring w by the second sandwiching means 610 and conveys the ring in the substantially elliptic shape from the first stocker (arrow 6 in FIG. 1). Moreover, the second convey unit 600, as the "third convey means" of the present invention sandwiches the ring w by the second sandwiching means 610 and conveys the rings in its substantially elliptic shape out of the first stocker 500 and conveys the rings into the second stocker 700 (arrow 6' in FIG. 1). Furthermore, the second convey unit 600 as the "fourth convey means" of the present invention sandwiches the ring w by the second sandwiching means 610 and conveys the ring w in its substantially elliptic shape out of the second stocker 700 (arrow 6" in FIG. 1). The second convey means 600 temporarily stores the plurality of rings w conveyed out of the first stocker 500 or the second stocker 700 according to the stacking order and transports them to the stacking unit 800 (arrow 7 in FIG. 1).

The second stocker 700 has configuration almost identical to that of the first stocker 500. The second stocker 700 is rotated around its axis by the second rotation means 710. Moreover, the second stocker 700 stores a plurality of rings w conveyed in by the second convey unit 600 while regulating the rings w from both sides so as to maintain the substantially elliptic shape.

In the stacking unit 800, a plurality of rings w returned to the substantially circular shape are stacked to form a stacked rings R which are transported to the conveyer belt 850 (arrow 8 in FIG. 1).

The conveyer belt 850 conveys the stacked rings R formed by the stacking unit 800 outside (arrow 9 in FIG. 1).

The control unit 900 is composed of a personal computer and a computer program for exhibiting various functions including the ring w management is installed. The control unit 900 includes: a timer 906; memory means 908; first selection means 910; first instruction means 912; second selection means 920; and second instruction means 922.

The timer 906 measures storage time X of each of the rings w in the first stocker 500.

The memory means 908 stores for each of the rings w: a circumferential length l and thickness t, storage time τ measured by the timer 906, and storage position in the first stocker 500 and the second stocker 700.

The first selection means 910 selects a ring w according to the circumferential length l and the thickness t stored in memory means 908 so as to obtain a most appropriate combination. The first instruction means 912 instructs the second convey unit 600 to transport the ring w selected by the first selection means 910 to the stacking unit 800 and gives various instructions to the respective units which will be detailed later.

The second selection means 920 selects a ring w to be transported from the first stocker 500 to the second stocker 700 according to the storage time τ and the size (l, t) of the ring w stored in the memory means 908. The second instruction means 922 instructs to transport the ring w selected by the second selection means 920 from the first stocker 500 to the second stocker 700.

Explanation will be given on the function of this system having the aforementioned configuration with reference to FIG. 1 to FIG. 12. Only main signals and data transmitted and received between the units will be explained below. However, other data and signals according to the communication protocol and the program language used in this system may also be transmitted and received.

Firstly, induction unit 100 sandwiches a substantially circular ring w conveyed by the conveyer belt 50, so as to be in the substantially elliptic shape. More specifically, the sandwiching means 110 is moved above the conveyer belt 50 together with the frame 104 along the rail 102 shown in FIG. 2. Moreover, the cylinder 116 is rotated by the rotary actuator 118 so that the claw portion 112 is directed downward. Here, the ring w is pushed in the horizontal direction by the sandwiching means (not depicted) at the end portion of the conveyer belt 50, so as to have the substantially elliptic shape. The cylinder 116 lowers the claw portion 112 to the position of the ring w via the rod 114. Here, the pushing by the sandwiching means at the end portion of the conveyer belt 50 is released and the ring w tends to return to the circular shape but is regulated by the claw portion 112 in the short-axis direction and sandwiched while maintaining the substantially elliptic shape. Moreover, since the claw portion 112 is lifted up by the cylinder 116, the ring w is lifted up from the conveyer belt 50 (dotted line in FIG. 2).

Next, the induction unit 100 sandwiching the ring w in the substantially elliptic shape by the sandwiching means is transported to the size measurement unit 200 (arrow 1 in FIG. 1). More specifically, the sandwiching means 110 is moved together with the frame 104 along the rail 102 shown in FIG. 2 up to a position opposing to the pair of rollers 210 and 220 of the size measurement unit 200. Moreover, the rotary actuator 118 rotates the cylinder 116 so that the cylinder 116 is substantially horizontal and the claw portion 112 opposes to the pair of rollers 210 and 220.

Next, the size measuring unit 200 measures the circumferential length l and thickness t of the ring w. The measurement procedure will be explained with reference to FIG. 3 to FIG. 5.

Firstly, the cylinder 228 drives upward the bracket 222 and the follower roller 220. When an upper portion of the bracket 222 is brought into abutment with the lower limit switch 208, the cylinder 228 stops. Here, the claw portion 112 is driven forward via the rod 114 by the cylinder 116 of the induction unit 100 so that the ring w is positioned outside of the pair of rollers 210 and 220 while maintaining the substantially elliptic shape.

Next, upward urging by the cylinder 206 is released and the bracket 222 lowers by its weight together with the follower roller 220 along the rail member 224. Here, the ring w becomes prolonged substantially elliptic shape and released from the claw portion 112 of the sandwiching means 110 of the induction unit 100 and becomes tense. The sandwiching means 110 of the induction unit 100 is driven rearward by the cylinder 116.

Subsequently, the drive roller 210 is rotated by the drive roller 214 and the ring w is rotated. Here, the first displacement sensor 230 transmits an output signal according to a displacement amount of the follower roller 220 (i.e., displacement amount of the contact 232 with respect to the highest position of the bracket 222) to the calculation means 231. Moreover, the temperature sensor 218 transmits an output signal according to the temperature of the drive roller 210 to the calculation means 231. The calculation means 231 calculates the circumferential length (inner circumferential length) l of the ring w from the diameters of the rollers 210 and 220 and the shaft-to-shaft distance between the rollers 210 and 220 according to the output signal from the first displacement sensor 930. Moreover, the calculation means 231 corrects the circumferential length l of the ring w according to the output signal from the temperature sensor 218.

This reduces the measurement error due to thermal expansion of the drive roller 210, thereby accurately measuring the circumferential length l of the ring w. Moreover, since the contact 232 is provided on a line connecting the axis of the drive roller 210 and the follower roller 220, the displacement of the follower roller 220 can be accurately detected. It should be noted that displacement of the follower roller 220 may be continuously measured during rotation of the ring w, so as to use the amplitude average during the constant rotation of the ring was a displacement amount. In this case, the circumferential length l of the ring w can be measured more accurately.

Next, the drive motor 214 is stopped, rotation of the drive roller 210 is stopped, and the thickness of the ring w tense with the weight of the bracket 222 is measured. That is, firstly, as shown in FIG. 5A, the cylinder 242 is driven to bring the inner contact 240 into abutment with the inner circumferential surface the ring w. Here, the abutment weight is preferably about 100 g which does not deform the ring w.

Next, as shown in FIG. 5B, the second displacement sensor 260 drives the outer contact 250 into abutment with the outer circumference of the ring w. Here, the second displacement sensor 260 transmits an output signal according to a displacement amount of the outer contact 250 to the calculation means 261. Moreover, the temperature sensor 218 transmits an output signal according to the temperature of the drive roller 210 to the calculation means 261. According to the output signal from the second displacement sensor 260, the calculation means 261 measures the thickness t of the ring w. Moreover, according to the output signal from the temperature sensor 218, the calculation means 261 corrects the thickness t of the ring w. It should be noted that it is also possible that the ring w is successively rotated by a predetermined angle by the drive roller 210 and thickness values at a plurality of positions are used to obtain an average thickness t.

Figure 11:
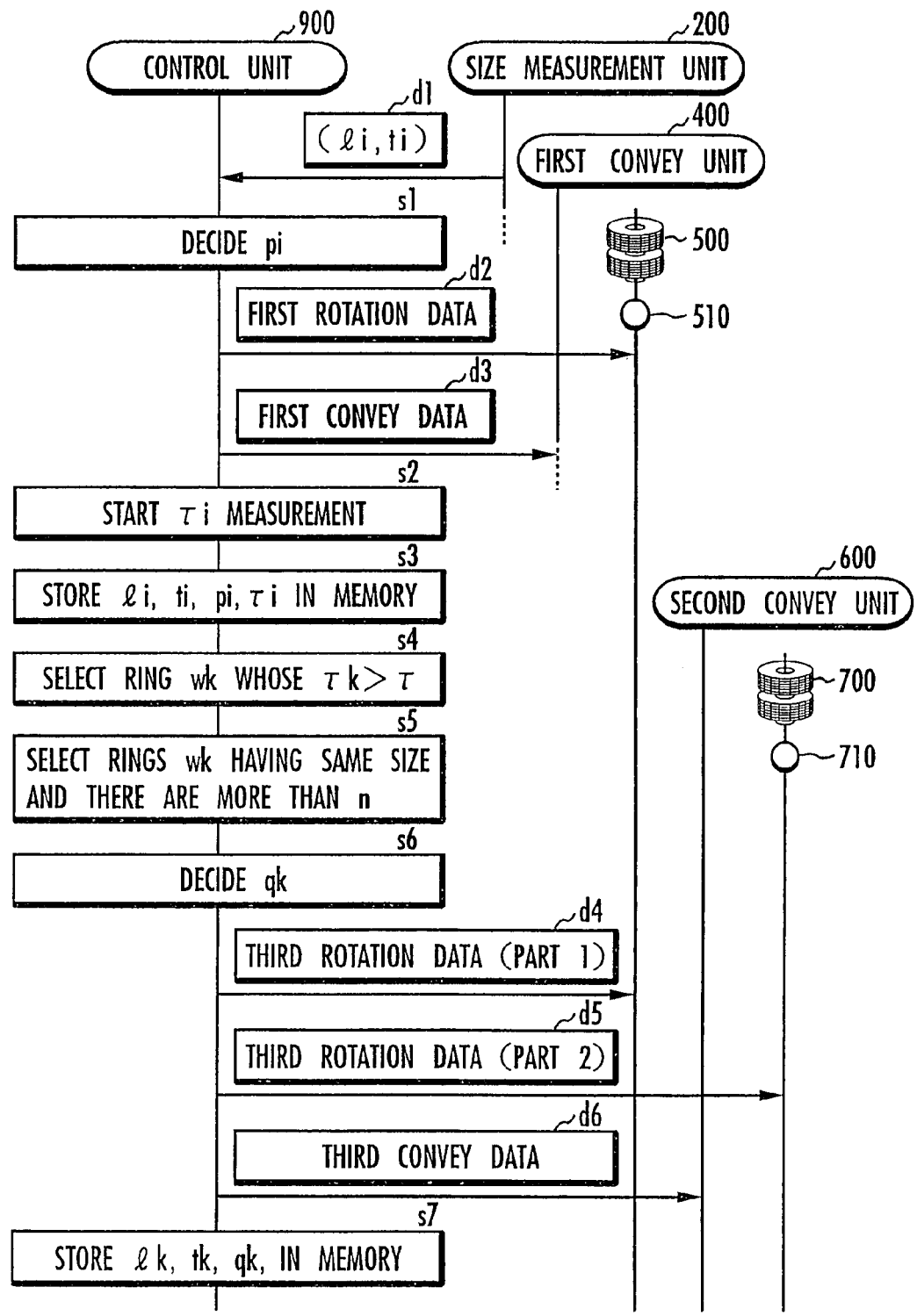
FIG. 11 and FIG. 12 explain function of the ring management system.

Moreover, the measurement data concerning the circumferential length li and the thickness ti measured and corrected by the calculation means 231, 261 are transmitted from the size measurement unit 200 to the control unit 900 (arrow d1 in FIG. 11).

After measurement of the circumferential length l and the thickness t, the ring w is transported by the sandwiching means 110 of the induction unit 100 while maintaining the substantially elliptic shape into the aligning unit 300 (arrow 3 in FIG. 1). More specifically, the claw portion 112 is driven forward by the cylinder 116 shown in FIG. 2 up to the position outside the ring w hung over the pair of rollers 210 and 220. After this, the shaft-to-shaft distance between the pair of rollers 210 and 220 is reduced, thereby releasing tension and the ring w tends to return to substantially circular shape but is regulated by the claw portion 112 in the short axis direction. Thus, the claw portion 112 sandwiching the ring w in the substantially elliptic shape is driven backward by the cylinder 116 and the cylinder 116 is rotated downward by the rotary actuator 118. The claw portion 112 is moved together with the frame 104 along the rail 102 upward of the plates 314 and 324 of the aligning unit 300 (virtual line in FIG. 7).

Next, rings w aligned in the horizontal direction by the aligning unit 300 are aligned in a perpendicular direction. This aligning procedure will be explained with reference to FIG. 6 to FIG. 8.

Firstly, ring w which has been transported by the sandwiching means 110 of the induction unit 100 is placed on the plates 314 and 324. Then, the holding distance of the sandwiching means 110 is enlarged and the ring w tending to return to the substantially circular shape is regulated by the regulating means 312 and 322 provided on the plates 314 and 324. Thus, as shown in FIG. 6, a pair of rings w are aligned in the horizontal direction by the first holding means 310 and the second holding means 320 while maintaining the substantially elliptic shape.

Next, the first convey means 340 sandwiches the ring w held by the first holding means 310, by the arm 344. The arm 344 reduces the interval and the ring w becomes prolonged substantially elliptic shape and released from the regulating means 312. The first moving means 340 is made to advance by the cylinder 346 and moves the ring w onto the upper holding means 331 of the perpendicular aligning means 330 (virtual line in FIG. 6) while maintaining the substantially elliptic shape. Furthermore, the arm 344 increases the sandwiching interval, which regulates the ring w tending to return to the substantially circular shape in the short-axis direction with the regulating means 333 and held as the substantially elliptic shape by the upper holding means 331 as shown in FIG. 8A.

Next, as shown in FIG. 8B, the first slider 337 moves along the first inclined guide portion 335 and the perpendicular aligning means 330 is moved to the opposing position of the second moving means 350. Thus, the perpendicular aligning means 330 is lifted up into the first inclined guide portion 335 and the lower holding means 332 opposes to the arm 354 of the second moving means 350.

The second moving means 350 sandwiches by the arm 354, the ring w held by the second holding means 320. The arm 354 reduces its interval to prolong the substantially elliptic shape of ring w and the ring w is released from the regulating means 322. The second moving means 350 is made to advance by the cylinder 356 and moves the ring w onto the lower holding means 332 of the perpendicular aligning means 330 while maintaining its substantially elliptic shape. Furthermore, the arm 354 enlarges the sandwiching interval, which regulates the ring w tending to return to the substantially circular shape, in the short-axis direction with the regulating means 334. As shown in FIG. 8B, the ring w is held in its substantially elliptic shape by the lower holding means 332 of the perpendicular aligning means 330. Thus, a pair of rings w arranged in the horizontal direction on the first and the second holding means 310 and 320 are aligned in the perpendicular direction while maintaining the substantially elliptic shape.

Next, as shown in FIG. 8C, the second slider 338 moves along the second inclined guide portion 336 and the perpendicular aligning means 330 is moved to the opposing position of the convey means 360. The upper convey mean 361 and the lower convey means 362 of the convey means 360 sandwich a pair of rings w aligned in the perpendicular direction by the perpendicular aligning means 330. The arm 364 reduces its interval to prolong the substantially elliptic shape of the ring w and the ring is released from the regulating means 333, 334. The convey means 360 is made to advance by the cylinder 366 and conveys the rings w aligned in the perpendicular direction to the convey out section 370 while maintaining the substantially elliptic shape.

Thus, according to the aligning unit 300, only by successively moving the rings w by the first moving means 340 and the second moving means 350 onto the perpendicular aligning means 330 gradually lifted up by the first inclined guide portion 335, a pair of rings aligned in the horizontal direction is aligned in the perpendicular direction.

It should be noted that it is possible to additionally provide holding means other than the first and the second holding means 310 and 320, moving means according to this holding means, holding means and convey means in the perpendicular aligning means 330, so that three or more rings w aligned in the horizontal direction are aligned in the perpendicular direction. Moreover, as the mechanism to move the perpendicular aligning means 330, the second inclined guide portion 336 and the second slider 338 may be omitted, and the first inclined guide portion 335 may be extended to extend the moving distance of the first slider 337.

Next, the first instruction means 912 of the control unit 900 decides a storage position pi of the ring w in the first stocker 500 (s1 in FIG. 11).

Moreover, the first instruction means 912 transmits "first rotation data" according to the storage position pi to the rotation means 510 of the first stocker 500 (arrow d2 in FIG. 11). The rotation means 510 receives this data and rotates the first stocker 500 so that a storage chamber 502 located at the storage position pi opposes to the first convey unit 400.

Furthermore, the first instruction means 912 transmits "first convey data" to the first convey unit 400 (arrow d3 in FIG. 11). The first convey unit 400 receives this data and sandwiches by the sandwiching means 410, the rings wi aligned in a vertical direction in the convey out section 370 of the aligning unit 300. The sandwiching means 410 reduces its sandwiching interval (see FIG. 9A and FIG. 9B) and the ring wi is released from the arm 364 of the convey-out means 360. The ring is conveyed into the storage chamber 502 at the storage position pi of the first stocker 500 while maintaining the substantially elliptic shape (arrow 5 in FIG. 1). With increase of the sandwiching interval of the sandwiching means 410, the ring wi tends to return to the substantially circular shape but is regulated in the short-axis direction by the regulating means 504 and stored in the storage chamber 502 at the storage position pi while maintaining the substantially elliptic shape.

Here, the timer 906 starts counting the storage time τi of the ring wi in the first stocker 500 (s2 in FIG. 11). Moreover, the memory means 908 stores for each of the rings wi: the circumferential length li, the thickness ti, the storage position pi in the first stocker 500, and the storage time τi (s3 in FIG. 11).

Furthermore, the second selection means 920 selects a ring wk whose storage time τk exceeds a predetermined time τ (s4 in FIG. 11). Moreover, the second selection means 920 selects some of the number of rings wk stored in the first stocker 500 and having identical size (l, t) stored in the memory means 908 and exceeding a predetermined number n (s5 in FIG. 11).

Then, the second instruction means 922 decides the convey-in position qk of the ring wk selected by the second selection means 920, in the second stocker 700 (s6 in FIG. 11).

Moreover, the second instruction means 922 transmits "third rotation data (part 1)" to the rotation means 510 of the first stocker 500, according to the storage position pk of the ring wk in the first stocker 500 and the convey-in position qk into the second stocker 700 (arrow d4 in FIG. 3); transmits "third rotation data (part 2)" to the rotation means 710 of the second stocker 700 (arrow d5 in FIG. 3); and transmits "third convey data" to the second convey unit 600 (arrow d6 in FIG. 2).

The rotation means 510 receives the data and rotates the first stocker 500 so that the storage chamber 502 at the storage position pk opposes to the second convey unit 600. Moreover, the rotation means 710 rotates the second stocker 700 so that the storage chamber 702 at the convey-in position qk opposes to the second convey unit 600. The second convey unit 600 sandwiches the ring wk by the sandwiching means 610 and conveys it out of the storage position pk of the first stocker 500 while maintaining the substantially elliptic shape (arrow 6 in FIG. 1). Moreover, the second convey unit 600 sandwiches the ring wk by the sandwiching means 610 and conveys it into the storage chamber 702 at the convey-in position qk of the second stocker 700 while maintaining the substantially elliptic shape (arrow 6' in FIG. 1). With increase of the sandwiching interval of the sandwiching means 610, the ring wk tending to return to its substantially circular shape is regulated by the regulation means 704 in the short-axis direction and is released from the sandwiching means 610 so as to be stored in the second stocker 700 while maintaining the substantially elliptic shape.

Here, the memory means 908 stores the circumferential length li, thickness ti, the storage position pi of the ring wi in the second stocker 700 (s7 in FIG. 11).

Subsequently, the first selection means 910 selects a plurality of rings wj to constitute a most appropriate combination according to the circumferential length li and the thickness ti of the ring wi stored in the memory means 908 from the first stocker 500 (s8 in FIG. 12).

Figure 12:
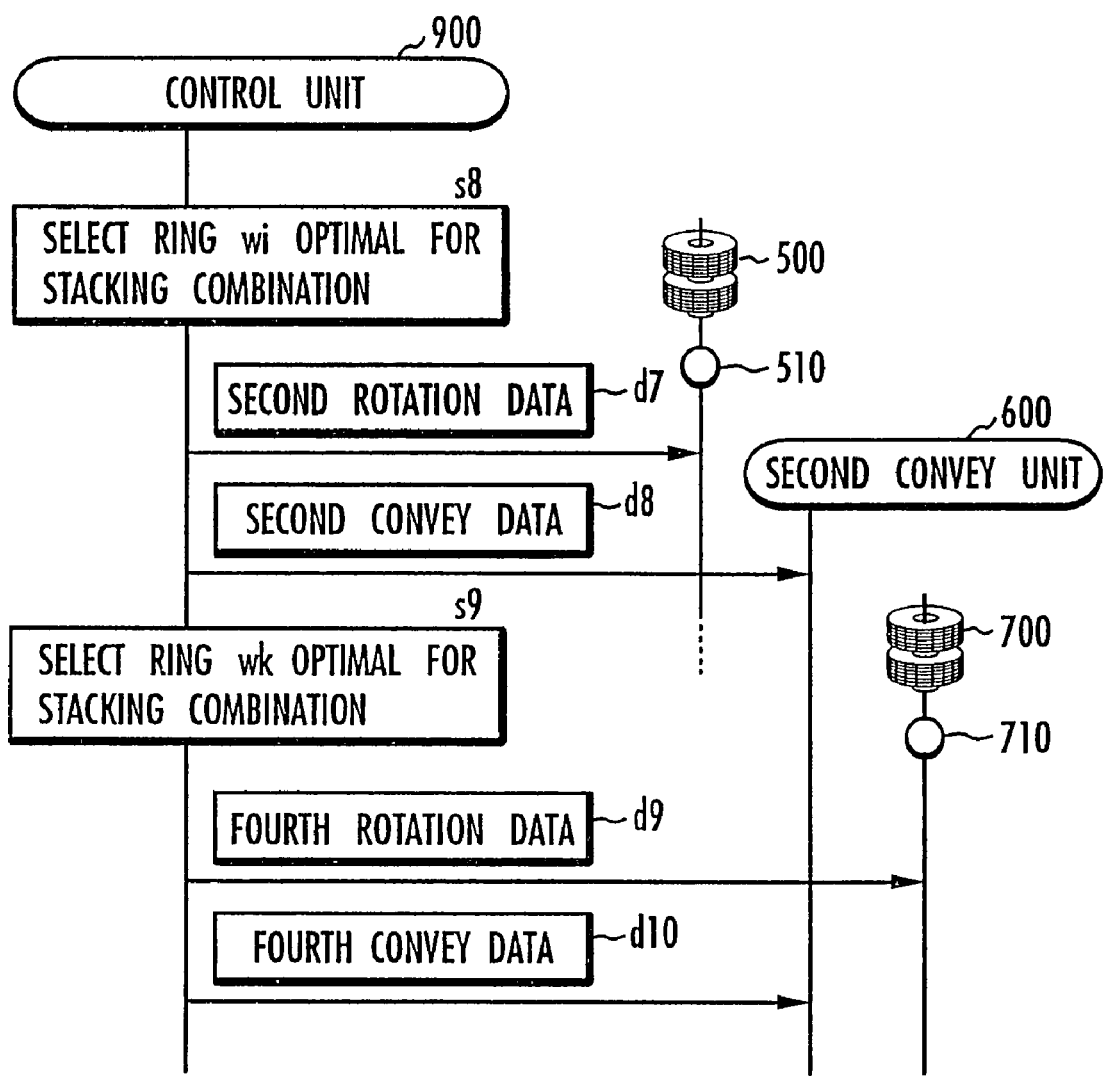

Then, the first instruction means 912 transmits "second rotation data" to the rotation means 510 of the first stocker 500 according to the storage position pj of the ring wj selected by the first selection means 910 (arrow d7 in FIG. 12). The rotation means 510 receives the data and rotates the first stocker 500 so that a storage chamber 502 containing the ring wj opposes to the second convey unit 600.

Moreover, the first instruction means 912 transmits "second convey data" to the convey unit 600 according to the storage position pj of the ring wj (arrow d8 in FIG. 12). The convey means 600 receives the data and sandwiches the ring wj by the sandwiching means 610 and the sandwiching interval is reduced to prolong the substantially elliptic shape of the ring wj so as to be released from the regulating means+ 504 (see FIG. 9A and FIG. 9B). After this, the second convey unit 600 conveys out the ring wj from the storage position pj in the first stocker 500 while maintaining the substantially elliptic shape (arrow 6 in FIG. 1) and conveys it to the stacking unit 800 (arrow 7 in FIG. 1).

Moreover, when it is impossible to select all the rings w constituting a stacked ring in the first stocker 500, the first selection means 910 selects a ring w appropriate to constitute the stacked ring R from the second stocker 700 according to the circumferential length lk and the thickness tk of the ring wk stored in the memory means 908 (s9 in FIG. 12).

The first instruction means 912 transmits "fourth rotation data" to the rotation means 710 according to the storage position qk of the ring wk selected by the first selection means, in the second stocker 700 arrow d9 in FIG. 12. The rotation means 710 receives this data and rotates the second stocker 700 so that the storage chamber 702 containing the ring wk opposes to the second convey means 600.

Moreover, the first instruction means 912 transmits "fourth convey data" to the second convey unit 600 according to the storage position qk of the ring wk (arrow d10 in FIG. 12). The second convey unit 600 receives this data, sandwiches the ring wk by the sandwiching means 610, and reduces the sandwiching interval to prolong the substantially elliptic shape of the ring wj and release the ring wj from the regulating means 704. Then, the second convey unit 600 conveys out the ring wk while maintaining the substantially elliptic shape from the storage position qj of the second stocker 700 (arrow 6" in FIG. 1) and conveys the ring to the stacking unit 800 (arrow 7 in FIG. 1).

The stacking unit 800 stacks a plurality of rings w transported by the second convey unit 600 in the radius direction, so as to constitute a stacked ring R and conveys the stacked ring R to the conveyer belt 850 (arrow 8 in FIG. 1). Thus, the stacked ring R is conveyed out by the conveyer belt (arrow 9 in FIG. 1).

According to the ring management system of the present embodiment, with the help of the size measurement unit 200, the first and second convey units 400 and 600, the first or second stocker 500 or 700, and the stacking unit 800, a series of steps including the size measurement of the ring w, convey, storage, and stacking can be performed without trouble (arrows 1 to 9 in FIG. 1). Accordingly, there is no trouble of difference in work quality depending on the working staffs and it is possible to improve the production efficiency and quality of the stacked ring R.

Moreover, ring wj constituting the stacked ring R is selected by the first selection means 910 according to the circumferential length lj and the thickness tj (size) measured by the size measurement unit 200. Then, a ring in the storage position pj stored in the memory means 908 in association with the size of the ring wj is conveyed out by the second convey unit 600 and stacked. Accordingly, a plurality of rings wj constituting a most appropriate combination are selected and accurately taken out of the first stocker 500 or the second stocker 700, thereby producing a high-quality stacked ring R.

Furthermore, the size measurement unit 200 measures the circumferential length l and the thickness t of the ring w which is kept in the substantially elliptic shape with suppressed deformation in the radius direction by the restoration elasticity. This can increase the size measurement accuracy.

Moreover, during a series of steps (arrows 2 to 7 in FIG. 1), the ring w is continuously kept in the substantially elliptic shape. Therefore, the ring w which has been made substantially elliptic during the above serial steps is deformed in an unexpected direction by its restoration elasticity or scratched by contact with something. Furthermore, the ring w can be handled as "an substantially elliptic work having a constant width in the short-axis direction" regardless of the difference in the size (l, t) Accordingly, holding means handling this work have common specifications, under which the convey means and storage means are constituted, thereby enabling substitution and flexibillity.

Moreover, it is possible to prevent that the same ring wk is stored in the first stocker 500 for a time exceeding a predetermined time τ or the first stocker contains more rings wk having the same size than a predetermined number n. This suppresses reduction of the selection width (s1 in FIG. 11) of the convey-in position pi of the ring wi in the first stocker 500 and prevents stagnation of the convey/convey-in of the ring wi (arrow 5 in FIG. 1).

Moreover, when a ring wj appropriate for constituting the stacked ring R is not selected from the first stocker 500, a ring w is selected from the second stocker 700.

It should be noted that the first selection means 910 may select a ring wj conveyed out of the first stocker 500 so that the convey-in position pi of the ring wi in the first stocker 500 opposes to the convey-out position pj of the ring wj.

In this case, it is possible to simultaneously perform the convey-in of the ring wi into the convey-in position pi by the first convey unit 400 and the convey-out of the ring wj from the convey-out position pj by the second convey unit 600, thereby increasing the production efficiency.

Moreover, the ring wj conveyed out from the first stocker 500 may be selected so that the opposing position of the convey-in position pi of the ring wi in the first stocker 500 is in the nearest position from the convey-out position pj of the ring wj in the circumferential direction.

There is also a case that the ring wi conveyed into the first stocker 500 and the ring wj conveyed out cannot be selected so that the convey-in position pi of the ring wi in the first stocker 500 opposes to the convey-out position pj of the ring wj. In this case after the ring wi is conveyed into the first stocker 500, the first stocker 500 should be rotated when the ring wj is conveyed out. As the ring w conveyed out from the first stocker 500, the ring wj at the nearest position to the opposing position of the convey-in position pi of the ring wi is selected as described above. For this, it is possible to minimize the rotation amount of the first stocker 500 during convey-out, thereby increasing the production efficiency of the stacked ring R.

It should be noted that in the aforementioned aligning unit 300, the rings w are aligned in the perpendicular direction when the rings w are moved from the first holding means 310 and the second holding means 320 onto the upper holding means 331 and lower holding means 332 of the perpendicular aligning means 330. As another configuration, rings w may be aligned in the perpendicular direction by arranging first holding means 310 and second holding means 320 from the horizontal direction to the perpendicular direction. Explanation will be given on aligning unit 300 having the other configuration with reference to FIG. 13 to FIG. 16. Like components are denoted by like reference symbols and their explanations are omitted.

In the aligning unit 300 of the other configuration, the perpendicular aligning means 330, the first moving means 340, and the second moving means 350 are omitted. Moreover, a first guide portion 311 extends in a horizontal direction along the arrangement direction of the first holding means 310 and the second holding means 320 and a second guide portion 321 extends below the first guide portion 311 in parallel. The first guide portion 311 has a first slider 313 moving along the first guide portion 311. The first slider 313 is connected to the first holding means 310. The second guide portion 321 has a second slider 323 moving along the second guide portion 321. The second slider 323 is connected to the first guide portion 311 and the second holding means 320.

Figure 13:
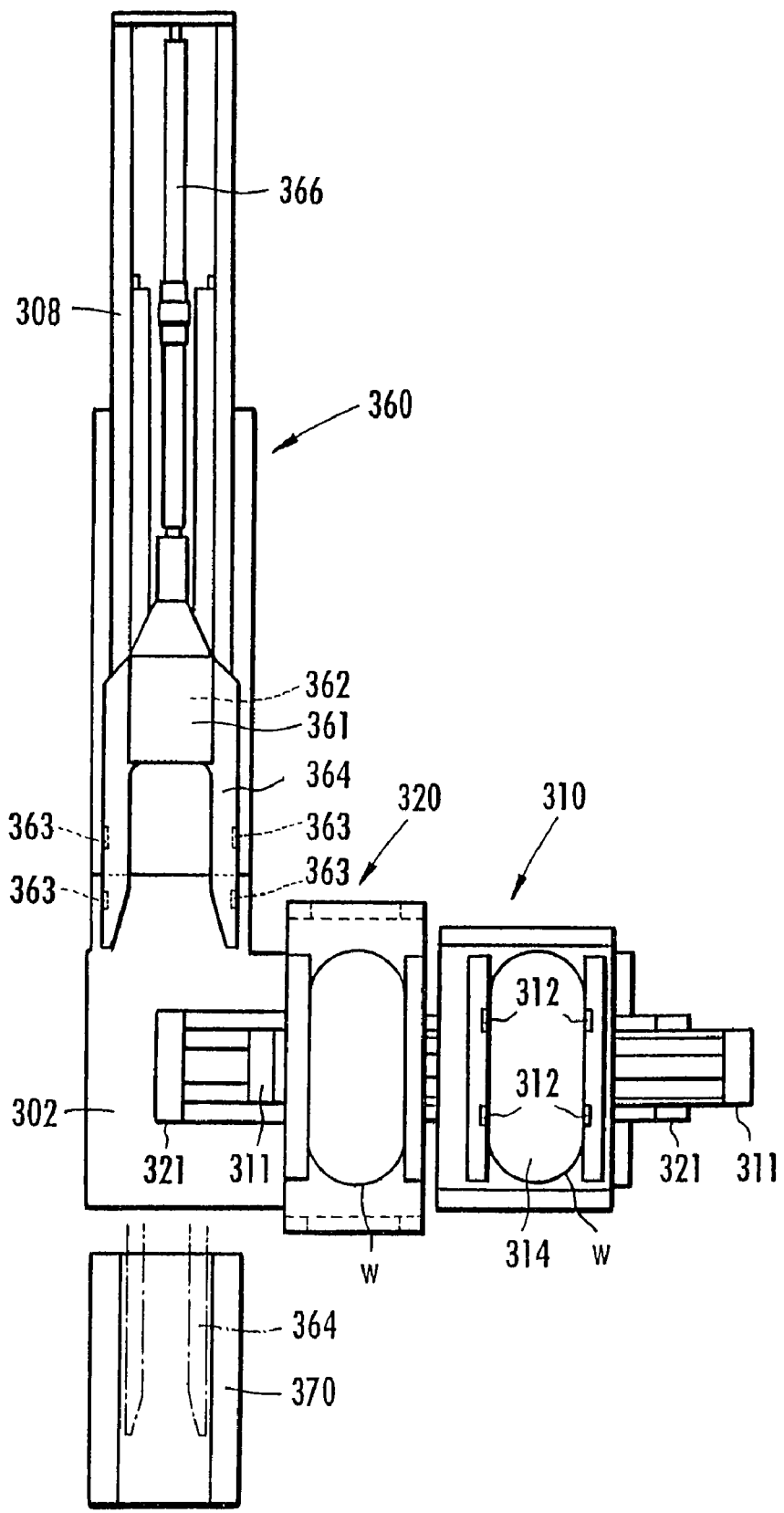
FIG. 13 and FIG. 14 explain an aligning unit according to a second embodiment.
Figure 14:
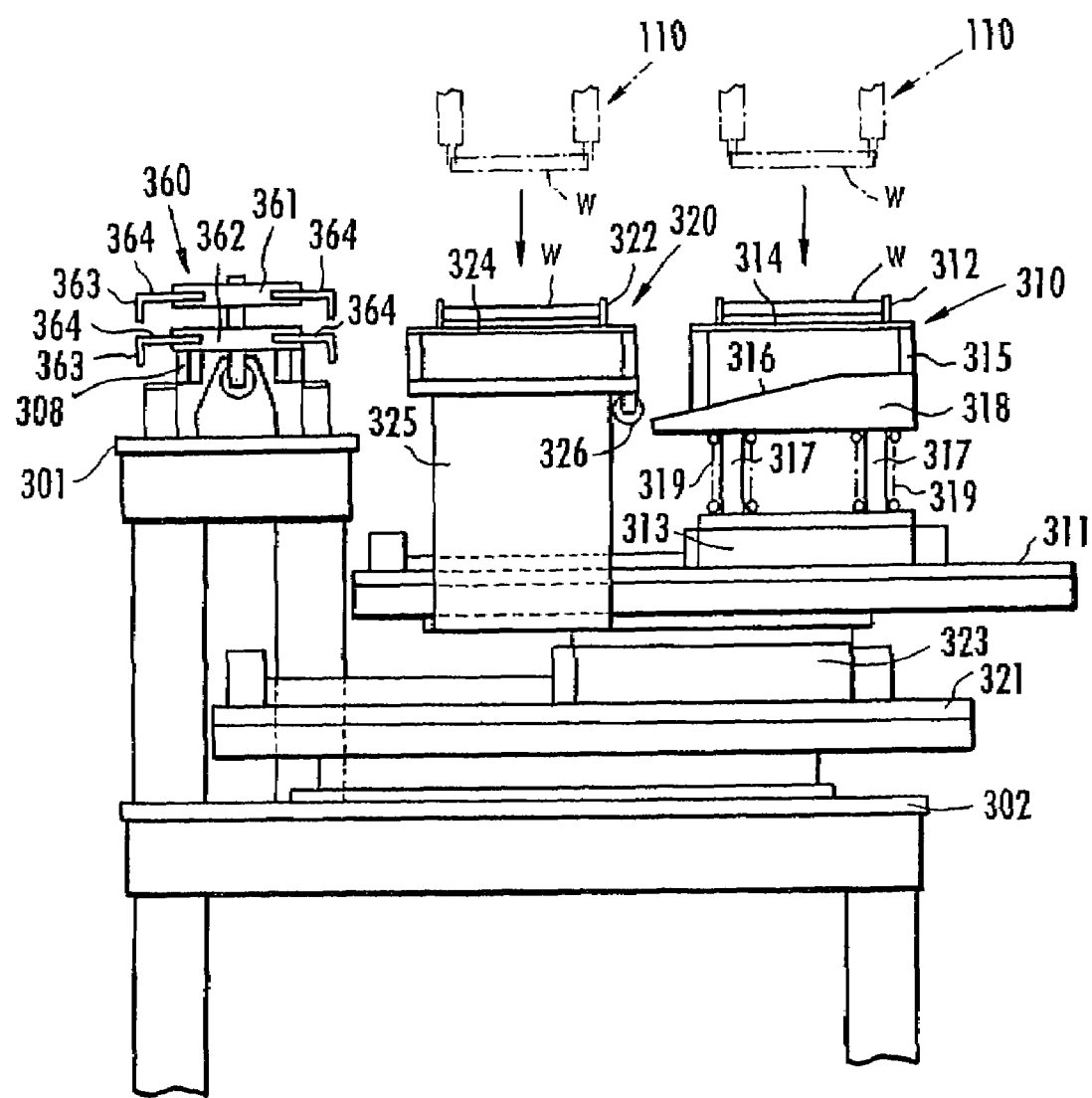

As shown in FIG. 13 and FIG. 14, the first holding means 310 has a guide rod 317 extending downward via a support frame (support member) 315. The guide rod 317 can come out of the first slider 313 and by this the support frame 315 can be lifted up and down. Moreover, the support frame 315 is urged upward by a spring member (urging means) 319. Furthermore, on the support frame 315, there is provided a cam member 318 having an inclined surface 316 gradually lowering toward the second holding means 320.

As shown in FIG. 14, the second holding means 320 is connected to the second slider 323 via a support frame 325 through which the first holding means 310 can move. On the support frame 325, there is provided a cam roller 326 sliding along an inclined surface 316 formed on the cam member 318.

Figure 15:
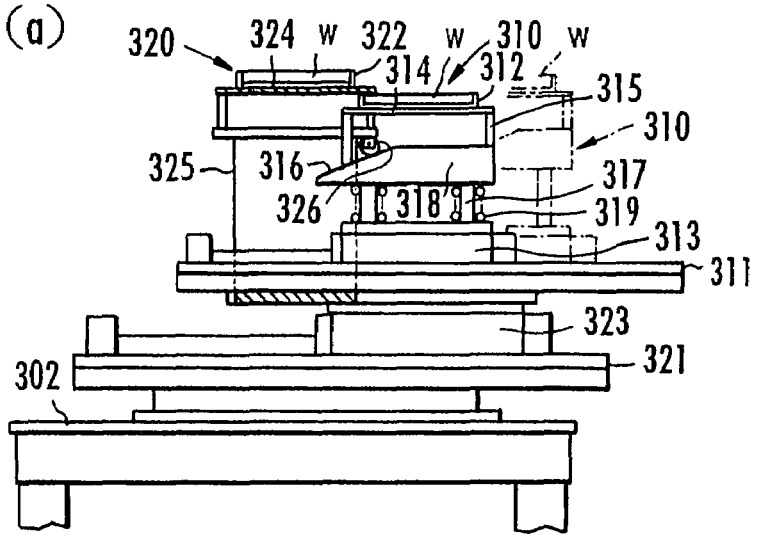
Figure 15:
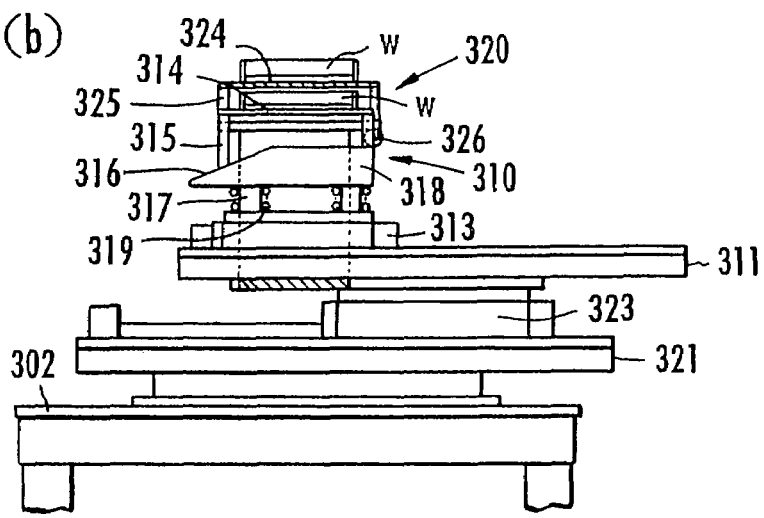
Figure 15:
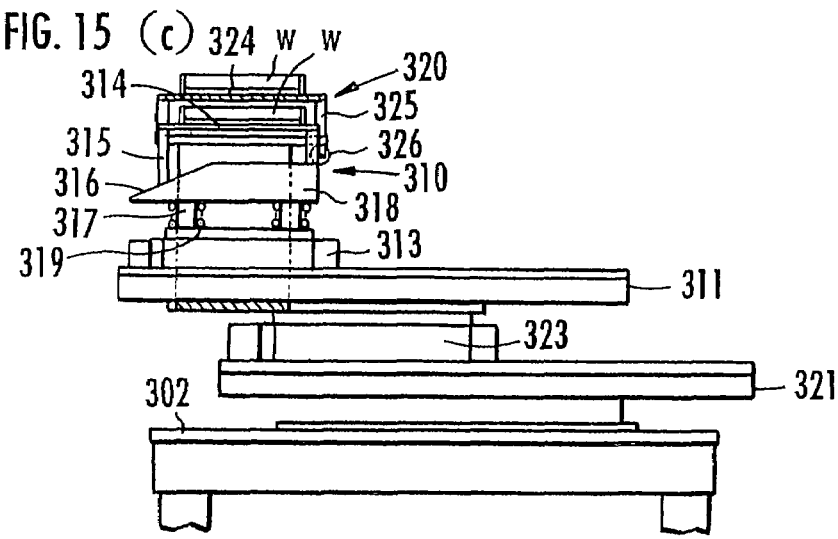

Explanation will be given on operation of the aligning unit 300 with reference to FIG. 15 and FIG. 16. Firstly, a pair of rings w are arranged in the horizontal direction and regulated by the regulating means 312 and 322 and held by the first holding means 310 and the second holding means 320 while maintaining the substantially elliptic shape.

Next, as shown in FIG. 15A, the first slider 313 moves along the first guide portion 311 and the first holding means 310 moves toward the second holding means 320. Here, the cam roller 326 of the second holding means 320 slides along the inclined surface 316 formed on the cam member 318 of the first holding means 310, and the support frame 315 of the first holding means 310 is relatively pushed downward. When the first slider 313 moves along the first guide portion 311, as shown in FIG. 15B, it goes below the first holding means 310 and the first holding means 310 is moved immediately below the second holding means 320. Thus, the pair of rings w arranged in the horizontal direction are aligned in the perpendicular direction.

Subsequently, as shown in FIG. 15C, the second slider 323 moves along the second guide portion 321, and the holding means 310 and 320 are moved to the position opposing to the convey-out means 360 (FIG. 13). An upper holding portion 361 and a lower holding portion 362 of the convey-out means 360 sandwich the pair of rings w held by the holding means 310 and 320 while maintaining the vertical arrangement and moves the rings w to the convey-out section 370 by the cylinder 366.

Thus, by placing rings w in the holding means 310 and 320 moved in the horizontal direction by the first guide portion 311 and the second guide portion 321, it is possible to align the pair of rings w arranged in the horizontal direction, in the perpendicular direction. It should be noted that in addition to the first holding means 310 and the second holding means 320, it is possible to add another holding means according to the number of rings w, so that three or more rings arranged in the horizontal direction are aligned in the perpendicular direction.

The invention claimed is:

1. A ring management system for management of a plurality of rings having elasticity in the radius direction for constituting a stacked ring; the system comprising:
   size measurement means for measuring size of the ring;
   first convey means for moving the ring whose size has been measured by the size measurement means;
   first storage means having a plurality of storage positions for storing rings conveyed in by the first convey means;
   second convey means for conveying out the rings from the first storage means;
   control means including:
   memory means for storing for each of the rings, size measured by the size measurement means in association with the storage position in the first storage means;
   first selection means for selecting a ring for constituting a stacked ring according to the ring size stored in the memory means;
   first instruction means to instruct the second convey means so as to convey out the ring selected by the first selection means from the storage position in the first storage means corresponding to the size of the ring stored by the memory means;
   aligning means for aligning in a perpendicular direction, a plurality of rings which have been measured in size and aligned in a horizontal direction before being conveyed into the first storage means by the first convey means; and
   the aligning means including:
   horizontal aligning means having a plurality of holding means for holding a plurality of rings arranged in the horizontal direction;
   perpendicular aligning means having a plurality of holding means for holding a plurality of rings arranged in the perpendicular direction;
   convey means for moving the perpendicular aligning means in the aligning direction of a plurality of rings by the horizontal aligning means and lifting up so that the holding means of the perpendicular aligning means successively oppose to the holding means of the horizontal aligning means;
   moving means for successively moving a plurality of rings held by the holding means of the horizontal aligning means onto the holding means of the perpendicular aligning means in synchronization with the movement of the perpendicular aligning means by the convey means; and
   convey-out means for conveying out the plurality of rings held by the holding means of the perpendicular aligning means while maintaining the arrangement in the perpendicular direction.

2. A ring management system for management of a plurality of rings having elasticity in the radius direction for constituting a stacked ring; the system comprising:
   size measurement means for measuring size of the ring;
   first convey means for moving the ring whose size has been measured by the size measurement means;
   first storage means having a plurality of storage positions for storing rings conveyed in by the first convey means;
   second convey means for conveying out the rings from the first storage means;
   control means including:
   memory means for storing for each of the rings, size measured by the size measurement means in association with the storage position in the first storage means;
   first selection means for selecting a ring for constituting a stacked ring according to the ring size stored in the memory means;
   first instruction means to instruct the second convey means so as to convey out the ring selected by the first selection means from the storage position in the first storage means corresponding to the size of the ring stored by the memory means;
   perpendicular aligning means for aligning in a perpendicular direction a plurality of rings aligned in the in a horizontal direction before being conveyed into the first storage means by the first convey means after the size measurement by the size measurement means; and
   the perpendicular aligning means including:
   a plurality of holding means arranged in the horizontal direction for holding a plurality of rings;
   moving means for successively moving a first one of the holding means immediately below a second one of the holding means, so that the plurality of holding means arranged in the horizontal direction are aligned in the perpendicular direction; and
   convey-out means for conveying out the rings held by the plurality of holding means arranged in the perpendicular direction while maintaining the state aligned in the perpendicular direction.

3. A ring management system for management of a plurality of rings having elasticity in the radius direction for constituting a stacked ring; the system comprising:
   size measurement means for measuring size of the ring;
   first convey means for moving the ring whose size has been measured by the size measurement means;
   first storage means having a plurality of storage positions for storing rings conveyed in by the first convey means;
   second convey means for conveying out the rings from the first storage means;
   control means including:
   memory means for storing for each of the rings, size measured by the size measurement means in association with the storage position in the first storage means;
   first selection means for selecting a ring for constituting a stacked ring according to the ring size stored in the memory means;
   first instruction means to instruct the second convey means so as to convey out the ring selected by the first selection means from the storage position in the first storage means corresponding to the size of the ring stored by the memory means;
   perpendicular aligning means for aligning in a perpendicular direction a plurality of rings aligned in a horizontal direction before being conveyed into the first storage means by the first convey means after the size measurement by the size measurement means; and
   the aligning means including:
   a plurality of holding means arranged in the horizontal direction for holding a plurality of rings;
   moving means for successively moving a first one of the holding means immediately below the second one of the holding means, so that the plurality of holding means arranged in the horizontal direction are aligned in the perpendicular direction; and
   convey-out means for conveying out the rings held by the plurality of holding means arranged in the perpendicular direction while maintaining the state aligned in the perpendicular direction, wherein at least one of the first and the second convey means includes:
a slider for moving the first one of the holding means toward the second one of the holding means;
a support member which can be lifted up and down along a guide rod extending from the slider and having the first one of the holding means at the upper portion thereof;
urging means for urging the support member upward;
an inclined portion provided on the support member and is gradually inclined downward toward the second one of the holding means; and
a cam roller for pressing the support member against the urging force by the urging means via the inclined portions as the slider moves, so as to guide the first one of the holding means immediately below the second one of the holding means.

4. A ring management system for management of a plurality of rings having elasticity in the radius direction for constituting a stacked ring; the system comprising:
size measurement means for measuring size of the ring;
first convey means for moving the ring whose size has been measured by the size measurement means;
first storage means having a plurality of storage positions for storing rings conveyed in by the first convey means;
second convey means for conveying out the rings from the first storage means;
control means including:
memory means for storing for each of the rings, size measured by the size measurement means in association with the storage position in the first storage means;
first selection means for selecting a ring for constituting a stacked ring according to the ring size stored in the memory means;
first instruction means to instruct the second convey means so as to convey out the ring selected by the first selection means from the storage position in the first storage means corresponding to the size of the ring stored by the memory means;
perpendicular aligning means for aligning in a perpendicular direction a plurality of rings aligned in a horizontal direction before being conveyed into the first storage means by the first convey means after the size measurement by the size measurement means; and
the perpendicular aligning means including:
a plurality of holding means arranged in the horizontal direction for holding a plurality of rings;
moving means for successively moving a first one of the holding means immediately below a second one of the holding means, so that the plurality of holding means arranged in the horizontal direction are aligned in the perpendicular direction;
convey-out means for conveying out the rings held by the plurality of holding means arranged in the perpendicular direction while maintaining the state aligned in the perpendicular direction, and a first slider and a second slider which is parallel to the first slider, the first and second sliders being slidable with respect to each other for moving the first holding means toward the second holding means.

5. The ring management system according to claim 4, the perpendicular aligning means further comprising:
a support member which can be lifted up and down along a guide rod extending from the slider and having the first holding means at the upper portion thereof
urging means for urging the support member upward;
an inclined portion provided on the support member and is gradually inclined downward toward the second holding means; and
a cam roller for pressing the support member against the urging force by the urging means via the inclined portions as at least one of the sliders move, so as to guide the first holding means immediately below the second holding means.

6. The ring management system according to claim 5, wherein the support member is a support frame, the support frame provided with a cam member having the inclined portion which is gradually inclined downward toward the second holding means.

7. The ring management system according to claim 5, wherein the urging means is a spring member for urging the support member upward along a guide rod.

8. The ring management system according to claim 4, the perpendicular aligning means further comprising:
a first guide portion extending in a horizontal direction along an arrangement direction of the first holding means and the second holding means, and
a second guide portion extending below the first guide portion parallel,
wherein the first guide portion supports the first slider moving along the first guide portion, the first slider being connected to the first holding means, and
wherein the second guide portion supports the second slider moving along the second guide portion, the second slider being connected to the first guide portion and the second holding means.

9. The ring management system according to claim 4, the perpendicular aligning means further comprising a first inclined guide portion inclined left-upward and the second convey means includes a second inclined guide portion in parallel to the first inclined guide portion on an intermediate table,
wherein the first inclined guide portion is provided with the first slider moving along the inclination, the first slider being connected to the perpendicular aligning means, and
wherein the second inclined guide portion is provided with the second slider moving along the inclination, the second slider being connected to the first inclined guide portion.

* * * * *